(12) United States Patent
Ellinger et al.

(10) Patent No.: US 8,201,945 B2
(45) Date of Patent: Jun. 19, 2012

(54) 2D/3D SWITCHABLE COLOR DISPLAY APPARATUS WITH NARROW BAND EMITTERS

(75) Inventors: Carolyn R. Ellinger, Rochester, NY (US); Paul J. Kane, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 13/196,996

(22) Filed: Aug. 3, 2011

(65) Prior Publication Data

US 2011/0285705 A1    Nov. 24, 2011

Related U.S. Application Data

(63) Continuation of application No. 12/021,519, filed on Jan. 29, 2008, now Pat. No. 8,029,139.

(51) Int. Cl.
*G03B 21/00* (2006.01)

(52) U.S. Cl. .............. 353/7; 353/10; 359/462; 359/464; 359/465

(58) Field of Classification Search .................. 353/7, 8, 353/10, 30; 349/5; 348/750; 382/154; 359/462, 359/464, 465, 478
See application file for complete search history.

(56) References Cited

U.S. PATENT DOCUMENTS

| | | | |
|---|---|---|---|
| 4,290,675 A | 9/1981 | Beiser | |
| 4,523,226 A | 6/1985 | Lipton et al. | |
| 4,967,268 A | 10/1990 | Lipton et al. | |
| 5,181,133 A | 1/1993 | Lipton | |
| 5,572,250 A | 11/1996 | Lipton et al. | |
| 6,280,034 B1 | 8/2001 | Brennensholtz | |
| 6,769,772 B2 | 8/2004 | Roddy et al. | |
| 7,050,020 B2 | 5/2006 | Uehara et al. | |
| 7,199,845 B2 | 4/2007 | Koyama et al. | |
| 7,265,902 B2 | 9/2007 | Lee et al. | |
| 2003/0214817 A1* | 11/2003 | Hacker | 362/555 |
| 2004/0113876 A1 | 6/2004 | Motomura | |

(Continued)

FOREIGN PATENT DOCUMENTS

WO    01/95544 A2    12/2001
(Continued)

OTHER PUBLICATIONS

"Infitec—A New Stereoscopic Visualisation Tool by Wavelength Multiplex Imaging," by Helmut Jorke and Markus Fritz, Proceedings Electronic Displays, Sep. 2003, Wiesbaden.

*Primary Examiner* — Francis M Legasse, Jr.
(74) *Attorney, Agent, or Firm* — Raymond L. Owens

(57) ABSTRACT

A 2D/3D switchable display system is disclosed having a selector for selecting a two-dimensional (2D) or a three-dimensional (3D) image processing path. A first processor processes image data through the two-dimensional image processing path; a second processor, independent of the first processor, processes image data through the three dimensional image processing path. An important feature is the provision of a first set of at least three emitters having corresponding first wavelengths, and a second set of at least three emitters having corresponding second wavelengths. A controller that during a 2D operation activates both first and second sets of emitters to present a single image, while during a 3D operation activates the first set of emitters to present a first image having one half of stereo image information and activates the second set of emitters to present a second image having a second half of stereo image information.

16 Claims, 18 Drawing Sheets

U.S. PATENT DOCUMENTS

| | | | |
|---|---|---|---|
| 2007/0057263 A1 * | 3/2007 | Kahen | 257/79 |
| 2007/0127121 A1 | 6/2007 | Maximus et al. | |
| 2007/0188711 A1 | 8/2007 | Sharp et al. | |
| 2007/0236617 A1 * | 10/2007 | Lippey | 349/5 |
| 2007/0242068 A1 * | 10/2007 | Han et al. | 345/427 |
| 2007/0296920 A1 | 12/2007 | Mezouari et al. | |

FOREIGN PATENT DOCUMENTS

| | | |
|---|---|---|
| WO | 2005-039192 | 4/2005 |
| WO | WO 2005039192 A1 * | 4/2005 |

* cited by examiner

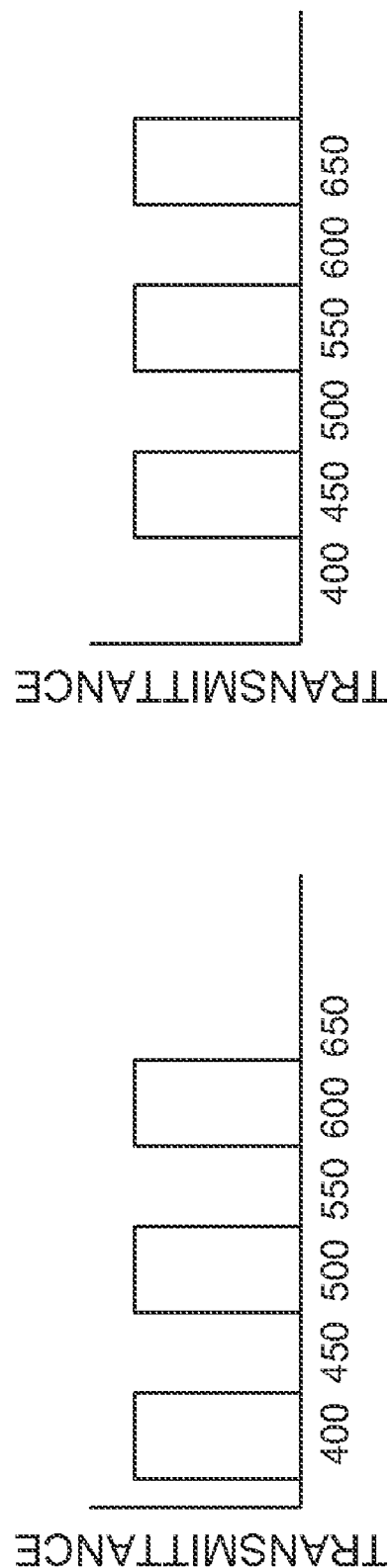

2D/3D SWITCHABLE COLOR DISPLAY APPARATUS WITH NARROW BAND EMITTERS

CROSS REFERENCE TO RELATED APPLICATION

This is a continuation of U.S. Ser. No. 12/021,519 filed Jan. 29, 2008 now U.S. Pat. No. 8,029,139 (U.S. Patent Application Publication No. 2009/0190095), entitled "2D/3D Switchable Color Display Apparatus With Narrow Band Emitters" by Carolyn R. Ellinger et al, the disclosure of which is incorporated herein in its entirety.

FIELD OF THE INVENTION

This invention generally relates to a display apparatus for forming color images from digital data that can be operated in either standard two dimensional (2D) mode, or in three dimensional (3D) mode.

BACKGROUND OF THE INVENTION

There are a number of technologies existing today for displaying 3D images to multiple viewers. Generally, these technologies are implemented in locations where a large number of viewers will pass through, and often pay for the 3D experience. These locations include movie theatres, science centers and the like. To-date, there is no commercially available 3D display for use in the home. Since the amount of 3D content is currently limited, there is not a large market at the present for a dedicated 3D display for home use. To open up the 3D market for home entertainment, a 2D/3D switchable display is needed.

The available technologies for displaying 3D images include 3D model rendering, stereoscopic, volumetric and holographic. One of the most popular and longest-lived is stereoscopic, which has the subcategories of stereo-with-eyewear and autostereoscopic. The category stereo-with-eyewear is frequently assumed when the term stereoscopic is used, and the term autostereoscopic is used to mean explicitly that no eyeglasses are required to see the 3D image. The 3D display or stereoscopic display of images usually entails viewing on one and the same device a series of images corresponding to the right eye and a series of images corresponding to the left eye of an observer. These two video sequences are in general captured or generated in such a way as to make it possible to comply with the geometry of human vision so that the offsets between the left view and the right view of the observer are reconstructed correctly by the visual system, producing stereo vision.

There are a number of autostereoscopic technologies in development that are 2D/3D switchable. For example, U.S. Pat. No. 7,050,020 B2 describes a liquid crystal display unit with first and second lenticular lenses. To display a 3D image, the first lenticular lens is arranged such that its optical axis coincides with the optical axis of the second lenticular lens, allowing pixels for left and right eyes to display images for their respective eyes. To display a 2D image, the first lenticular lens is arranged such that its optical axis is shifted from the optical axis of the second lens by half a pixel pitch, allowing the pixels for the left eye and right eyes to display the same image independently. In another example, U.S. Pat. No. 7,199,845 B2 describes a switching type liquid crystal display device that includes a liquid crystal panel to activate and deactivate a parallax barrier to switch between a 2D and 3D image display mode. Further, U.S. Pat. No. 7,265,902 B2 demonstrates a display apparatus containing a light shielding plate and a light deflection plate. The light shielding plate switches so as to allow the light deflection elements to provide, or not provide, a 3D display mode. Unfortunately, these approaches are complex and expensive to manufacture, and the image quality is poor in 3D viewing mode, due to well-known difficulties in the angular dependence of the light modulation mechanisms in such technologies. Further, these technologies require the movement or alteration of physical structures inside the device to switch between 2D and 3D viewing modes.

There are four primary technologies for 2D/3D switchable displays in the category of stereo-with-eyewear, hereafter simply, stereoscopic. In all cases, the viewer is presented with a "left eye" and a "right eye" image. The first technology presents alternating left eye and right eye images that are electronically synchronized with LCD shutter glasses such that the lens over the left eye is transparent only when the left eye image is shown and vise-versa. A number of US patents in this field have issued to Lipton et al. (assigned to StereoGraphics Corporation), such as U.S. Pat. Nos. 4,523,226, 4,967,268, 5,181,133 and 5,572,250. However, the electronics for driving a 3D display using shutter glasses are complex. Also, the perceived luminance of the display is approximately half of that obtainable if the same system were used for 2D display, since only one eye is viewing at any given time in the 3D mode. The second technology is known as anaglyph, and the separation is accomplished by two broad color filters worn as glasses (typically red-blue), which correspond to the left eye/right eye image content. Anaglyph has a significant amount of color-cross talk and has many objectionable image artifacts. U.S. Pat. No. 4,290,675 by Besser describes one version of a 2D/3D switchable anaglyph display system.

The third and fourth stereoscopic technologies use passive glasses with alternating left eye, right eye image presentation. The third technology defines the image content by polarization, and the corresponding glasses have a left lens of opposite linear polarization than the right lens. Often, these polarization systems use two imaging paths where the two paths are combined by polarizing one of these two paths in a first specified orientation and by polarizing the other path in a second orientation. The glasses allow the user to view the combined 3D image. These polarization systems can be flat panel or are more often projection type. Projection systems use a special polarization preserving screen, which considerably raises the complexity and cost of such devices. Additionally, projection systems tend to have low luminance; each eye views only one polarization so the best case scenario would be a luminance of half of the available light. Furthermore, projection systems have polarization cross-talk since the polarizing glasses and internal polarizing means are not lossless.

The fourth technology is a passive filter technology using interference filters to separate the images by wavelength, or spectral bandpass. This technology was developed by DaimlerChrysler AG, and in 2003 Infitec GmbH emerged to commercialize the technology. The workings of the Infitec system can be easily understood with respect to "INFITEC—a new stereoscopic visualisation tool by wavelength multiplex imaging," by H. Jorke and M. Fritz, Proceedings Electronic Displays September 2003, Wiesbaden. The publication of this paper can be found on the Infitec website (http://www.infitec.net/infitec_english.pdf). To date, this filter system has been exclusively utilized in projection applications. A projector using a broadband light source includes a color filter wheel having left and right image interference filters. The viewer wears passive glasses with filters of spectral bandpass corresponding to that of the filter wheel. Much like the polarization method, the luminance of these systems is low due to the inefficient use of the projector light by the filters. It has been proposed that the Infitec system would work best as a projection systems using laser sources, however, this is not known to have been actually implemented in practice.

Although all of the above 3D technologies are switchable to 2D displays, the aforementioned systems have been optimized for 3D performance. The corresponding 2D displays for each of the aforementioned technologies, typically have a 2D display with similar color gamut, efficiency and power consumption to that of currently available 2D systems. Additionally, with the exception of the Infitec system, all of the 3D technologies above use only broadband light sources, and are not designed for sources with narrow emission spectra. For the Infitec system, filtering of a broadband source to create two sets of primaries does not impart any benefit for 2D operation over that of a conventional display. Additionally, it has been suggested that for hypothetical 3D systems using 6 narrow emitters, such as lasers, the placement of the emitters would be close together in order to reduce the image processing needed for 3D. Placing the corresponding primaries near each other needlessly limits the 2D performance in a 2D/3D switchable display system.

There are 2D only display systems that have been described having more than six emitters. The additional emitters are employed for a variety of reasons, including improving luminance or color gamut. Generally these systems are not suitable for 3D display by wavelength segregation since the position of the emitters would not allow for the division of these six or more emitters into filterable groups of emitters.

A few projection solutions have been proposed using more than three-color light sources. However, the bulk of solutions proposed have not targeted color gamut expansion. Disclosures of projectors using more than three-color sources include U.S. Pat. No. 6,280,034 by Brennesholtz, which discloses a projection apparatus using up to six colors, employing RGB as well as CMY (cyan, magenta, and yellow) colors that are obtained from a broadband light source. Although such an approach may be useful to enhance brightness and luminance for some colors, the addition of complementary CMY colors does not expand the color gamut and, in practice, could result in a smaller color gamut, as indicated in the disclosure of U.S. Pat. No. 6,280,034. Additionally, the embodiment disclosed in U.S. Pat. No. 6,280,034 uses light sources having different polarizations, which prevents use of an analyzer for improving contrast.

U.S. Pat. No. 6,769,772 by Roddy et al describes a six color projection display system with increased color gamut. However, the embodiments disclosed in U.S. Pat. No. 6,769,772 teach against using two different red emitters, and therefore would not be suitable for use in 3D applications using spectral selection. Roddy et al. concern themselves with maximizing the 2D gamut of their particular projection display apparatus; they do not consider the use of the six emitters in alternative or non-projection systems.

Patent Application WO 01/95544 A2 by Ben-David et al. also discloses a display device and method for color gamut expansion using four or more substantially saturated colors. While the disclosure of application WO 01/95544 provides improved color gamut, however, the embodiments and methods disclosed apply conventional solutions for generating and modulating each color. The solutions disclosed use either an adapted color wheel with a single spatial light modulator or use multiple spatial light modulators, with a spatial light modulator dedicated to each color. When multiplexing a single spatial light modulator to handle more than three colors, a significant concern relates to the timing of display data. The spatial light modulator employed must provide very high-speed refresh performance, with high-speed support components in the data processing path. Parallel processing of image data would very likely be required in order to load pixel data to the spatial light modulator at the rates required for maintaining flicker-free motion picture display. It should also be noted that the settling time for conventional LCD modulators, typically in the range of 10-20 msec for each color, further shortens the available projection time and thus constrains brightness. Moreover, the use of a filter wheel for providing the successive component colors at a sufficiently high rate of speed has further disadvantages. Such a filter wheel must be rotated at very high speeds, requiring a precision control feedback loop in order to maintain precision synchronization with data loading and device modulation timing. The additional "dead time" during filter color transitions, already substantial in devices using 3-color filter wheels, further reduces brightness and complicates timing synchronization. Coupling the filter wheel with a neutral density filter, also rotating in the light path, introduces additional cost and complexity. Although rotating filter wheels have been adapted for color projection apparatus, the inherent disadvantages of such a mechanical solution are widely acknowledged. Further, without some shuttering means, color crosstalk becomes a problem. Color crosstalk occurs, for example, at a transition of light color while the corresponding data transition is also in process. Alternative solutions using a spatial light modulator dedicated to each color introduce other concerns, including proper alignment for component colors. The disclosure of application WO 01/95544 teaches the deployment of a separate projection system for each color, which would be costly and would require separate alignment procedures for each display screen size and distance. Providing illumination from a single light source results in reduced brightness and contrast. Moreover, the added cost in using four or more spatial light modulators may not justify an incremental improvement in color gamut for consumer projection devices. Thus, while the disclosure of application WO 01/95544 teaches gamut expansion in theory, in practice there are a number of significant drawbacks to the design solutions proposed. As a studied consideration of application WO 01/95544 clearly shows, problems that were difficult to solve for 3-color projection, such as timing synchronization, color alignment, maintaining brightness and contrast, cost of spatial light modulators and overall complexity, are even more challenging when attempting to use four or more component colors.

Thus, although there have been some proposed solutions using two or more spatial light modulators for projection apparatus that use three or more colors, there is room for improvement. Lamps and other broadband light sources set practical limits on achievable brightness levels, particularly where color filter wheels or similar devices that cause some amount of light attenuation or have inherent "dead space" during transitions are employed. The use of color wheels makes it unwieldy to alter or adjust illumination timing. In the face of these difficulties, the advantages of expanding the color gamut with an additional color would not be considered within reach using conventional design approaches.

The design of practical 2D/3D switchable displays for home use has not been completely addressed. Additionally, the tradeoff between performance in 2D mode and 3D mode for color gamut and luminance efficiency has not been completely addressed. The system components and design rules governing the means to drive a display in both modes, as well as the rules for placement of emitters in a proper color space are still needed for a viable switchable 2D/3D display system for home use.

SUMMARY OF THE INVENTION

It is an object of the present invention to provide a 2D/3D switchable display system comprising:

a) a selector for selecting a two-dimensional (2D) or a three-dimensional (3D) image processing path;

b) a first processor for processing image data through the two-dimensional image processing path;

c) a second processor, independent of the first processor, for processing image data through the three dimensional image processing path;

d) a first set of at least three emitters having corresponding first wavelengths;

e) a second set of at least three emitters having corresponding second wavelengths; and f) a controller that during a 2D operation activates both first and second sets of emitters to present a single image, while during a 3D operation activates the first set of emitters to present a first image having one half of stereo image information and activates the second set of emitters to present a second image having a second half of stereo image information.

A feature of the present invention is the use of light sources having a sufficient degree of spectral purity, i.e. narrow bandwidth of spectral emission components, in order to provide a broad color gamut for both 2D and 3D applications. LEDs, widely available, inexpensive, nearly monochromatic, and having a long component life, are used in one preferred embodiment. LEDs are inherently small, bright, and low-power devices, with fast switching times. Laser sources have become widely available and are continuing to become affordable, as monochromatic sources are used in another exemplary embodiment of the present invention.

It is an advantage of the present invention that it provides an apparatus capable of displaying high color gamut 3D images, and of achieving enhanced color gamut for displaying 2D digital images when compared against conventional 3-color display equipment such as color monitors. The apparatus and method of the present invention allows the 2D display of colors that were not achievable with 3-color systems, and enables a 2D/3D switchable display for home use.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

FIGS. 11b and 11c show the spectral transmittance of the dichroic bandpass filters;

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

As discussed above, there is a need to have a low cost 2D/3D switchable display for consumer use to expand the potential market for 3D content. In order to achieve this goal, it is important to have a high efficiency system, leading to a lower power display. There are many types of display technology that can be used to create the display system of the present invention, however, all of the inventive systems utilize narrow band emitters that define six primaries of the 2D display. Preferably, the emitters are not filtered in 2D display mode. Examples of potentially useful display technologies for 2D/3D switchable displays include rear and front projection displays with either spatial modulators or electromechanical gratings; and flat panel displays such as light emitting diode (LED) devices, preferably those containing quantum dot emitters. These specific implementations will be discussed in detail in the examples.

Figure 5:
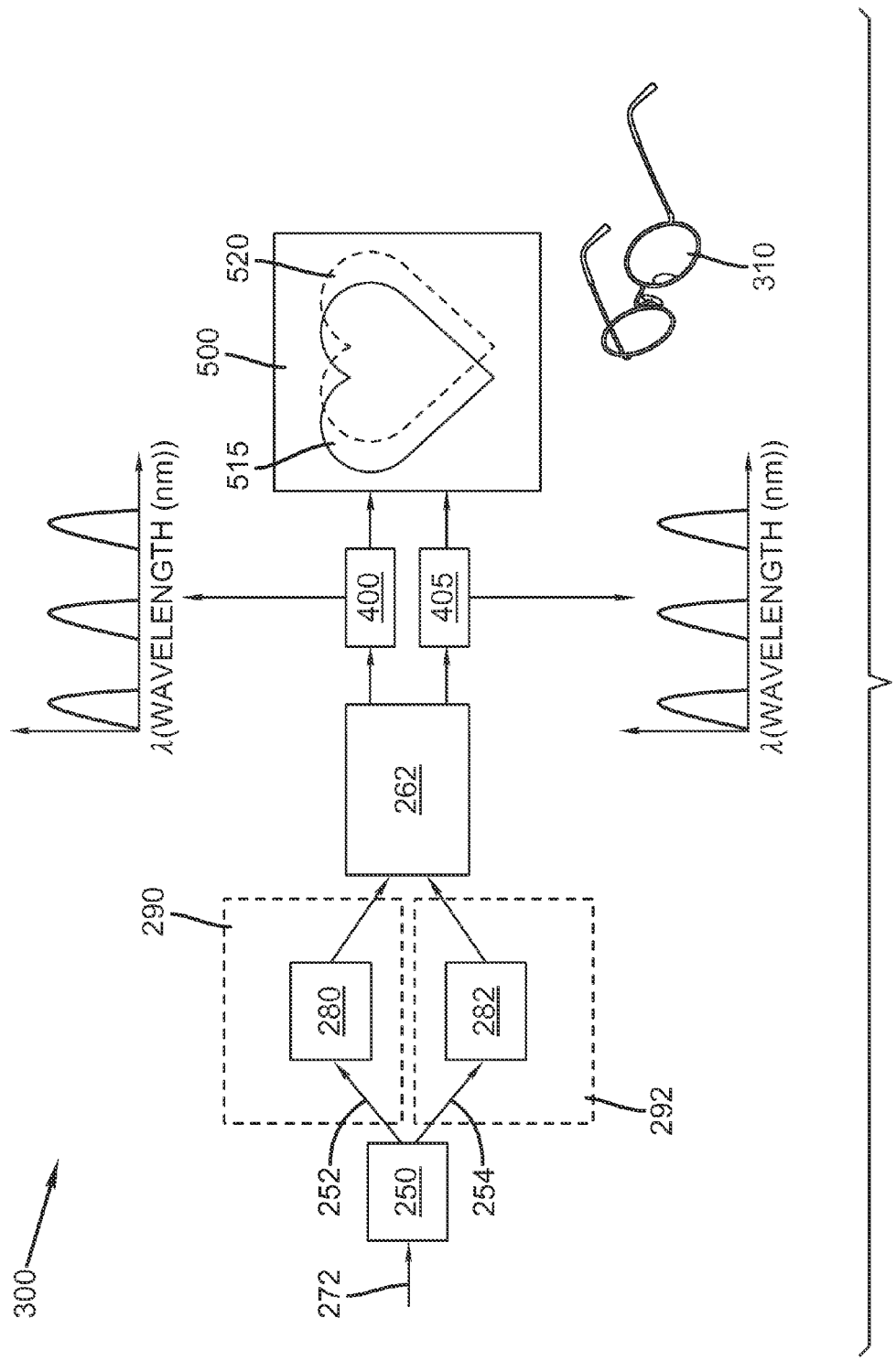
FIG. 5 illustrates one embodiment of a 2D/3D switchable display system of the present invention.

FIG. 5 shows an overview of the components of the inventive 2D/3D switchable display system 300. A selector 250 is provided for selecting a two-dimensional (2D) image processing path or a three-dimensional (3D) image processing path. The selector may be a physical portion of the system or electronic or software in nature. A viewer may manually use the selector 250 to set the 2D/3D display system 300 into either 2D or 3D mode. In an alternative embodiment, the selector may choose the correct mode based on the incoming image information 272. When the selector 250 has selected 2D mode, the incoming image information 272 is directed via the 2D data path 252 to a first processor 280 for processing image data through the two-dimensional image processing path. As shown in FIG. 5, the first processor 280 can be separate from the selector 250, or alternatively can be integrated with the selector 250. When the selector 250 has selected 3D mode, the incoming image information 272 is directed via the 3D data path 254 to a second processor 282, independent of the first processor 280, for processing image data through the three dimensional image processing path. Although second processor 282 is independent from the first processor 280, this should not be taken to mean that they are necessarily physically separated. As shown in FIG. 5, the 2D image processing path 290 is made up of the 2D data path 252 and the first processor 280, as well as a means of communicating with controller 262. Similarly, the 3D image processing path 292 is made up of the 3D data path 254 and the second processor 282, as well as a means of communicating with controller 262.

As shown in FIG. 5, 2D/3D display system 300 has a first set of at least three emitters 400 having corresponding first wavelengths and a second set of at least three emitters 405 having corresponding second wavelengths. The three emitters of the first set of emitters 400 have peak emission wavelengths in the red, green and blue regions of the spectrum. The red region is defined by wavelengths between 600 nm and 700 nm; the green region is defined by wavelengths between 500 nm and 600 nm, and the blue region of the spectrum is defined by wavelengths between 400 nm and 500 nm. The three emitters of the second set 405 have peak emission wavelengths in the red, green and blue regions of the spectrum, which are different than the peak wavelengths of the first set of emitters 400. The emitters 400, 405 may be any narrow band emitters, including LEDs, lasers or thin-film LEDs including quantum dots. As implied by the narrow band designation, each emitter has a FWHM (as defined earlier) of no more than 30 nm, preferably no more than 15 nm, most preferably no more than 10 nm.

The first set of emitters 400 and the second set of emitters 405 are controlled by controller 262. Display controller 262, is electrically connected to both sets of emitters. During operation, the controller 262 provides appropriate signals to the emitters 400,405 to cause the display 500 to show the image content in image signal 272. The controller 262 applies signals to the emitters 400,405 in a way that the during 2D operation both sets of emitters 400,405 are used to present image information, while during 3D operation the first set of emitters 400 are used to present one half of stereo image information as an image 515 and the second set of emitters 405 are used to present a second half of stereo image information as an image 520.

When the 2D/3D display system is in 3D mode, 3D image-viewing glasses 310 are worn by the viewer. 3D image-viewing glasses 310 have a left eye filter set and a right eye filter set that correspond to first emitters 400 and second emitters 405 and their associated wavelengths, so as to present one set of wavelengths to each eye of the viewer for creating stereo imaging. Using the example of FIG. 5, when the display 505 is viewed through the 3D image-viewing glasses 310 the right eye will see only first image 515, and the left eye will see only second image 520. These images will be combined by the visual system of the viewer to provide a 3D viewing experience. In a preferred embodiment, the left eye filter set and the right eye filter set of 3D image-viewing glasses 310 are interference filters with less than 10% overlap in the spectral bandpass.

As shown in FIG. 5, the emitters 400, 405 can be separate from the display 500 for projection display systems. In projection display systems, emitters 400 and 405 will be coupled to the display 500 by optical components. Additionally, for projection display systems the controller 262 may also control a shuttering means such as liquid-crystal spatial light modulators or electromechanical grating means. These specifics will be discussed further below.

Figure 6:
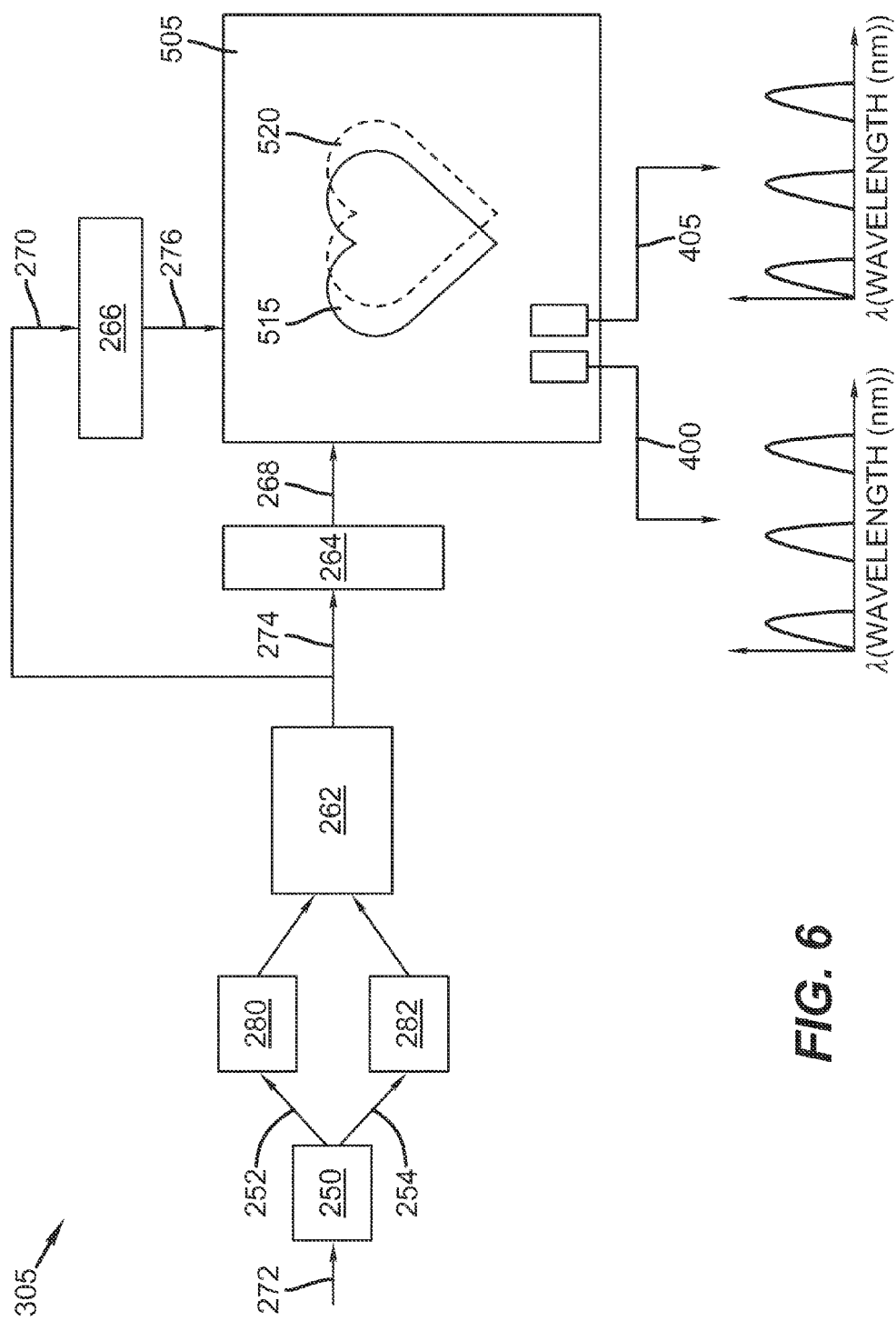
FIG. 6 illustrates another embodiment of a 2D/3D switchable display system of the present invention.

In the embodiment shown in FIG. 6, the emitters 400, 405 are part of flat panel display 505. In this embodiment, the emitters 400, 405 are thin-film light emitting elements, such as LEDs containing quantum dots. The 2D/3D display system 305 with a flat panel display further includes a row driver 264, and a column driver 266. Controller 262 will typically receive an input digital signal from either the first processor 280 or the second processor 282, and use this signal to provide a synchronization signal 274 to row driver 264 and a color signal 276 to column driver 266 for driving the light-emitting elements.

Figure 7:
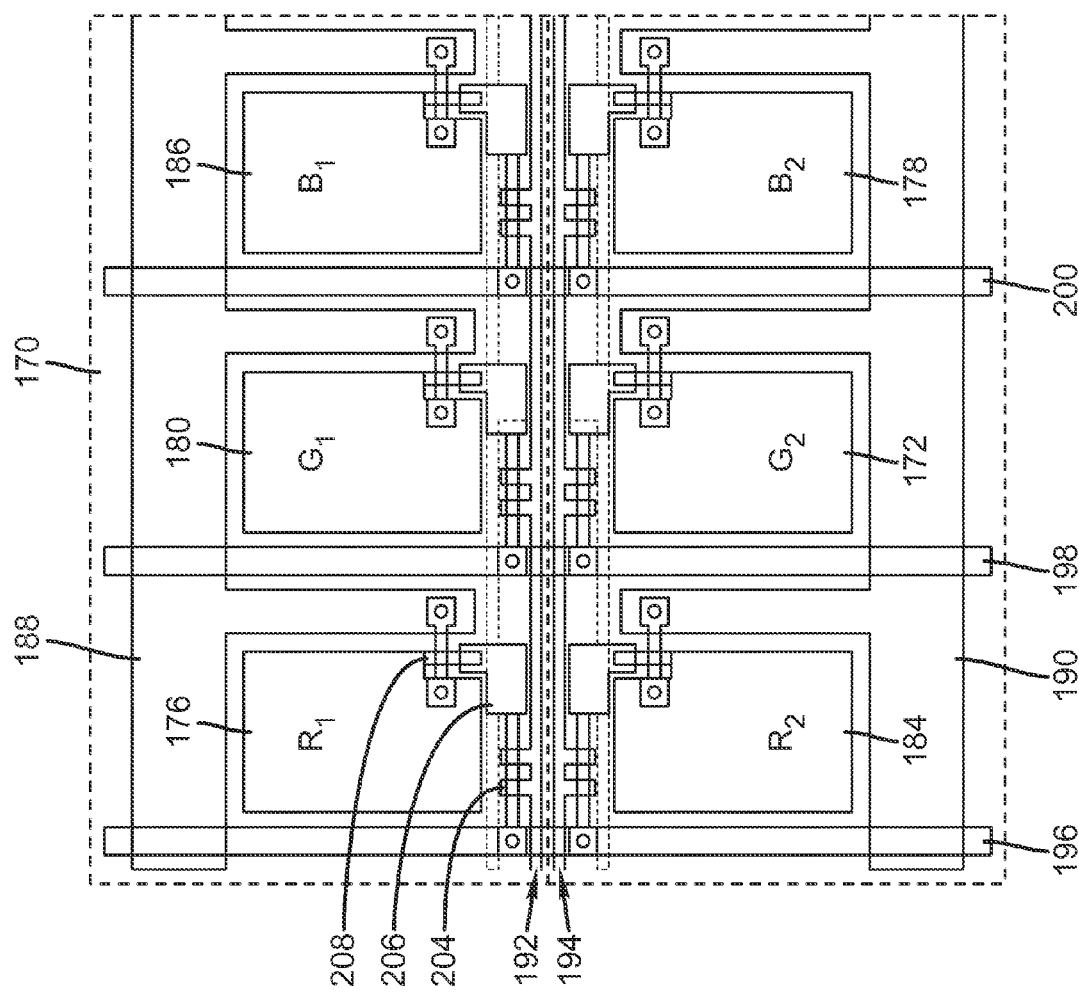
FIG. 7 shows the details of the display portion of the 2D/3D switchable display system of FIG. 6.

The flat panel embodiment of FIG. 6 is better understood with respect to FIG. 7. Within full-color flat panel display 505, the light-emitting elements will typically be patterned beside each other as depicted in FIG. 7. As shown in this figure, display 505 has an array of light-emitting elements that emit red light at a first wavelength (R1) 176 and red light at a second wavelength (R2) 184; green light at a first wavelength (G1) 180 and green light at a second wavelength (G2) 172; and blue light at a first wavelength (B1) 186 and blue light at a second wavelength (B2) 178. In this embodiment, the first set of emitters 400 is made up of emitters R1, G1, and B1 shown by 176, 180 and 186 respectively. The set of emitters 405 is made up of emitters R2, G2, and B2 shown by 184, 172 and 178 respectively. Although the pixels of FIG. 7 are shown having a particular geometry and spatial arrangement, these should not be considered limiting. The current invention includes pixels of unequal sizes, different shapes, and other possible arrangements. Additionally, while the portion 170 of the display 505 as shown in FIG. 7 applies active matrix circuitry to drive the light-emitting elements of the display device, the display device may also, alternatively, apply passive-matrix circuitry.

As shown in FIG. 7, active matrix circuitry for driving a device of the present invention will typically include power lines 188, 190 for providing current to the light-emitting elements, select lines 192, 194 for selecting a row of circuits, drive lines 196, 198, 200, 202 for providing a voltage to control each of the circuits, select TFTs 204 for allowing the voltage for a drive line 196, 198, 200, 202 to be provided only to the light-emitting elements in a column that receive a select signal on a select line 192 or 194, a capacitor 206 for maintaining a voltage level between each line refresh and a power TFT 208 for controlling the flow of current from the power lines 188, 190 to one of the electrodes for each light-emitting element.

To better understand the 2D/3D switchable display system of the present invention, it is helpful to understand the fundamentals of color, gamut and efficiency for display technologies. A number of different color spaces have been used to describe the colors seen by the human visual system. In one attempt to define a workable color space, Commission Internationale de l'Eclairage (International Commission on Illumination) developed the X, Y, Z tristimulus values and the CIE Chromaticity Diagram using the x, y chromaticity coordinates, based on a standard observer and first published in 1931. In later work, the 1964 CIE Chromaticity Diagram in the u'v' chromaticity coordinates was established, based on a linear transformation of the x, y chromaticity coordinates, in which equal distances on the new Diagram represent nearly equal perceived color changes. Useful background discussion of the CIE Chromaticity Diagram and of color perception and color models in general can be found in Billmeyer and Saltzmann's *Principles of Color Technology*, Third Edition, Wiley and Sons, and in chapter 7 of Dr. R. W. G. Hunt's *The Reproduction of Color*, Fifth Edition, Fountain Press, England.

Figure 1:
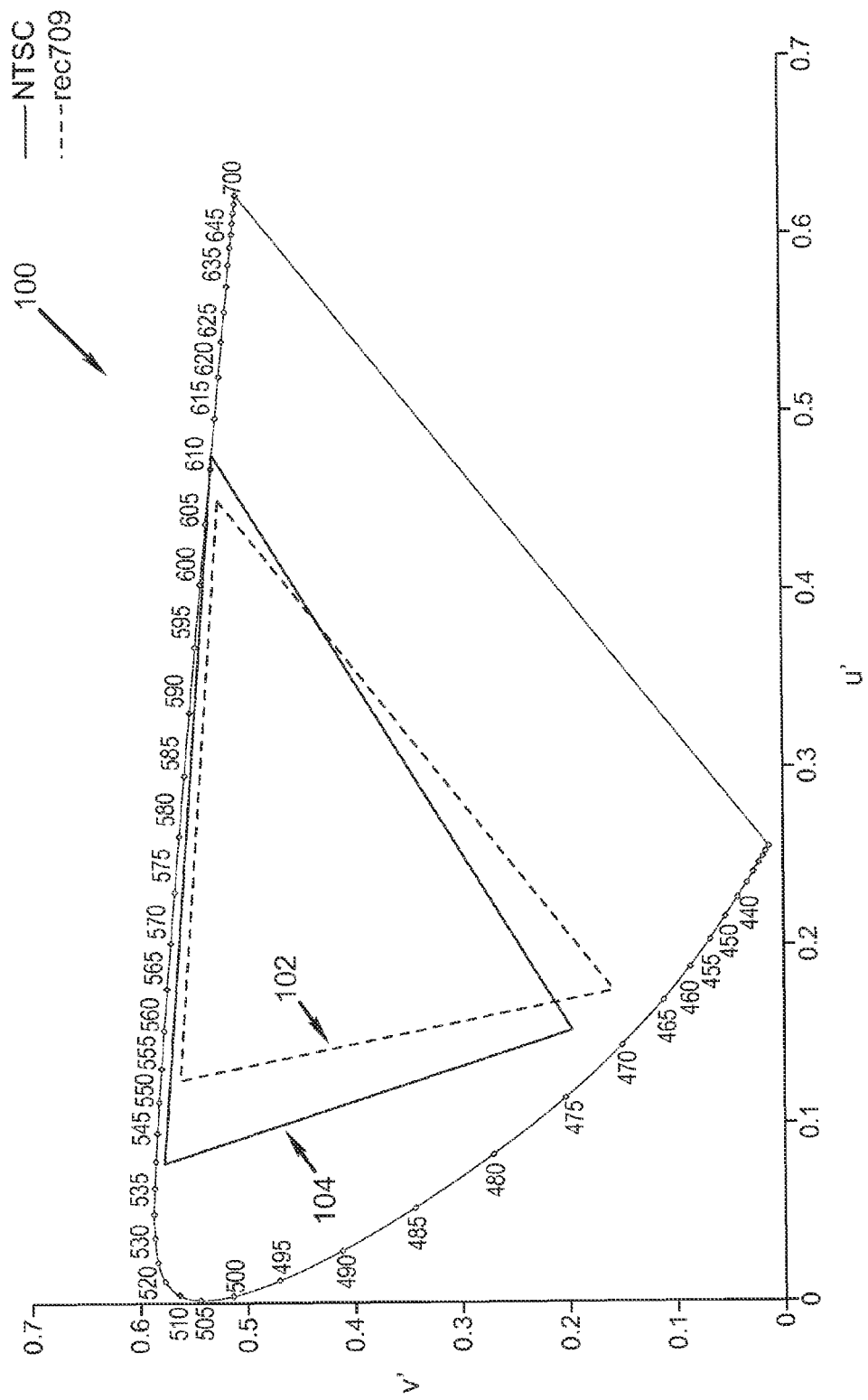
FIG. 1 is a graph showing the NTSC TV and Rec. 709 HDTV color gamuts known in the prior art on a CIE u'v' chromaticity diagram.

FIG. 1 shows a color gamut representation known in the prior art using the u'v' coordinate space, wherein the range of colors visible to the human eye is shown as the gamut 100. Pure, saturated spectral colors are mapped to the "horseshoe" shaped periphery of the visible gamut 100. The interior of the "horseshoe" contains all mappings of mixtures of colors, such as spectral red with added blue, which becomes magenta, for example. The interior of the horseshoe can also contain mixtures of pure colors with white, such as spectral red with added white, which becomes pink, for example. The overall color area defined by the "horseshoe" curve of visible gamut 100 is the full range of color that the human visual system can perceive. It is desirable to represent as much as possible of this area in a color display to come as close as possible to representing the original scene as it would be perceived by a human observer.

Referring again to the mapping of FIG. 1, observe that visible gamut 100 shows the full extent of human-perceivable color that, in theory, could be represented for a display. A restricted NTSC triangle 104 shows the limitations placed on achievable colors using early color CRT phosphors. The Rec. 709 triangle 102 is the HDTV color triangle, and is similar to the performance of current CRT phosphors. It is instructive to note that, because the colors of CRT phosphors for NTSC triangle 104 and Rec. 709 triangle 102 are not typically saturated, the points defining the color of each phosphor do not lie on the periphery of visible gamut 100. Hence, for example, colors such as turquoise and neon orange can be perceived by the eye in the actual scene but are beyond the color capability of typical CRT phosphor system and are also outside of the more recent HDTV standard. As is clear from FIG. 1, the range of colors that can be represented by the traditional color triangles falls far short of the full perceivable range of visible gamut 100. It is also instructive to note that as seen in FIG. 1, the color gamut is essentially defined by a polygon, where each vertex corresponds to a substantially pure, saturated color source used as a component color. The area of the polygon corresponds to the size of the color gamut. To expand the color gamut requires moving one or more of these vertices closer to the outline of visible gamut 100, but the addition of a color that is inside the polygon defining the color gamut does not expand the color gamut.

Figure 2A:
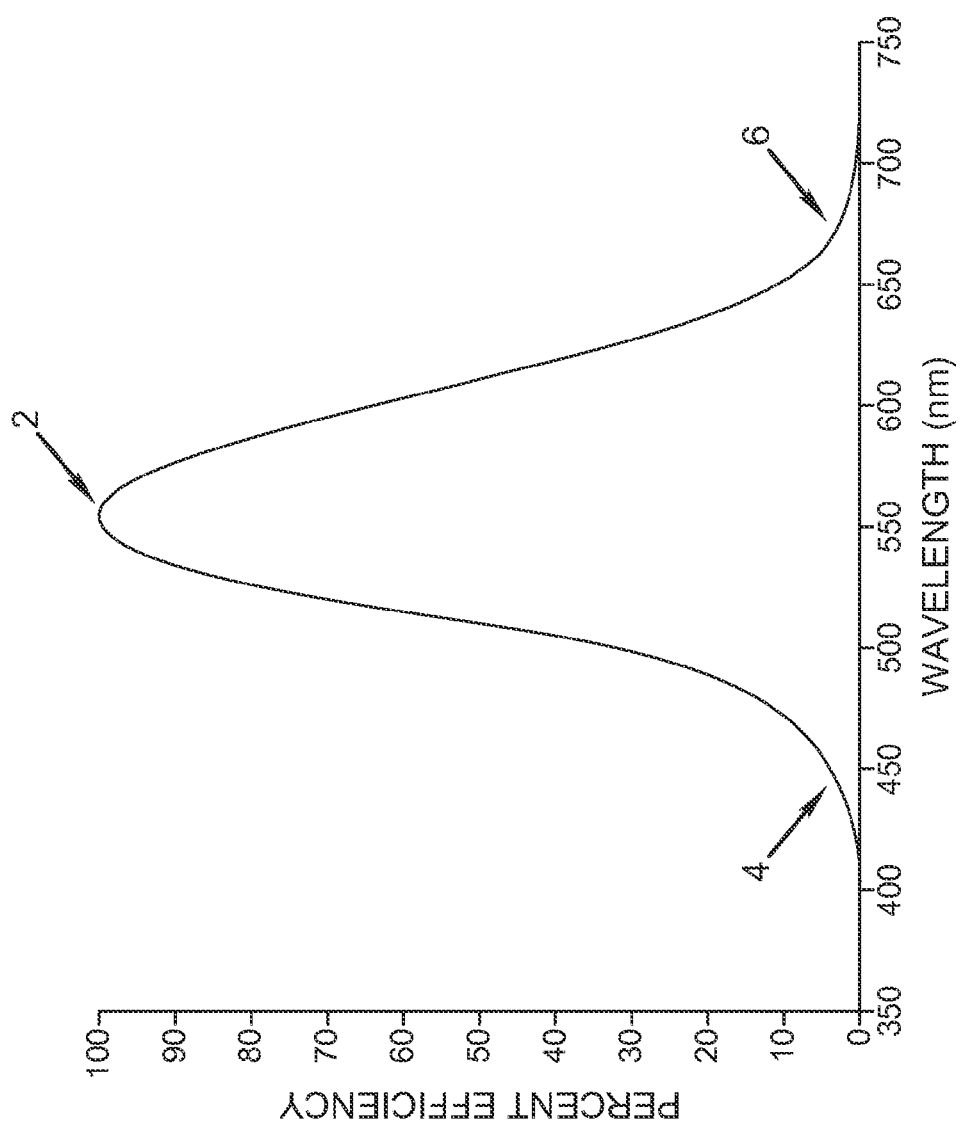
FIG. 2a is an eye luminosity curve known in the prior art.

Within the information display application space, devices are desired to deliver a large color gamut with high efficiency. Two important measures of display efficiency are commonly used. First, luminous efficacy measures the light generated that is perceived by the eye as influencing the sensation of brightness, compared to the overall radiant flux. That is, it is the ratio of luminous flux to radiant flux. This quantity has units of lumens/Watt, where the Watts refer to optical power. Second, luminous efficiency measures the same luminous flux, but compared to the input electrical power needed to generate the output light. Its units are also lumens/Watt, where now the Watts refer to electrical power. The two requirements of large color gamut and high efficiency are often in conflict with one another, due to the fact that in order to expand the color gamut of the display, the red and blue emitters must often be shifted towards very long and very short wavelengths, respectively. The human eye is much less sensitive to these wavelengths than to wavelengths of light near the center of the visible spectrum. This loss of sensitivity to energy at the extremes of the visible spectrum occurs because luminous flux is calculated by cascading the eye sensitivity function with the radiant power spectrum of light emission. FIG. 2a shows the luminosity function of the human eye, which shows the relative efficiency of the eye in converting energy at each wavelength within the visible spectrum to an increase in perceived brightness. As this figure shows, the human eye is most sensitive to energy with a wavelength of between 550 and 560 nm 2, but much less sensitive to a very short wavelength 4 or very long wavelength 6 energy within the visible spectrum.

Figure 3:
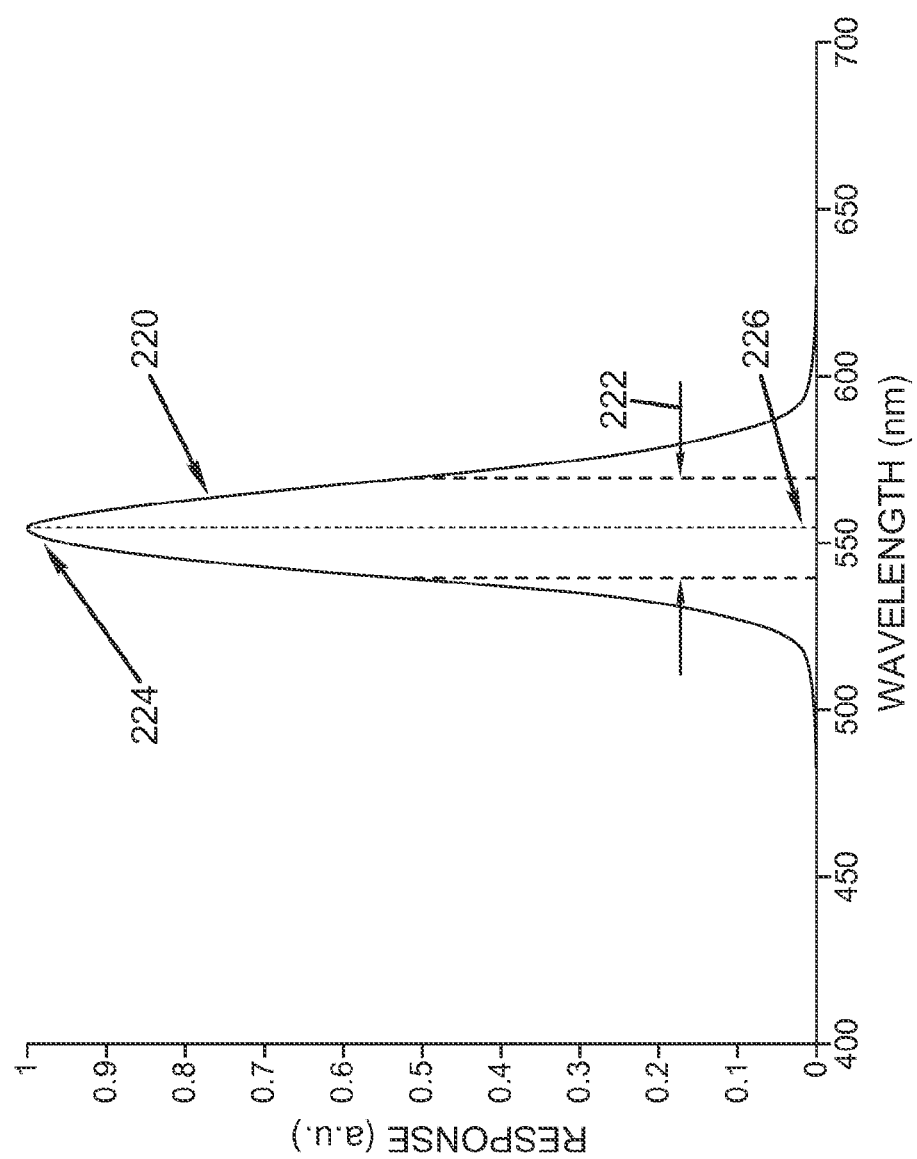
FIG. 3 is a model spectral emission curve known in the prior art.

The improvement of both luminance efficiency and color gamut requires an understanding of the emitter characteristics and how they will determine the available gamut. While the human eye luminosity curve of FIG. 2a and the CIE chromaticity diagram of FIG. 1 provide fundamental information about the relative sensitivity of the eye to different wavelengths, and how the visual system perceives the range of wavelengths as different colors, they do not immediately tell us how to co-optimize a system's gamut and efficiency. For example, FIG. 2a directly demonstrates the relative sensitivity of the eye to monochromatic emitters as a function of wavelength. In practice, we must almost always deal with emitters that have spectra of finite width, as illustrated in FIG. 3. Here a model emitter spectrum 220 having a Gaussian profile is shown, normalized to a peak value 224 of 1.0 at the corresponding dominant wavelength 226, and having a full-width-half-maximum (FWHM) value 222, which measures the width of the spectrum at the 0.5 response level. For quantum dot type emitters, typical values of FWHM are on the order of 30 nm. For narrowband or broadband emitters, i.e. emitters having a small or larger value of FWHM, the relative brightness of the emitter to the eye is characterized by the luminous flux, computed by multiplying the curve in FIG. 2a with the curve in FIG. 3 (centered at the proper wavelength and scaled to the proper width), and then integrating the area under the resulting curve.

Figure 8:
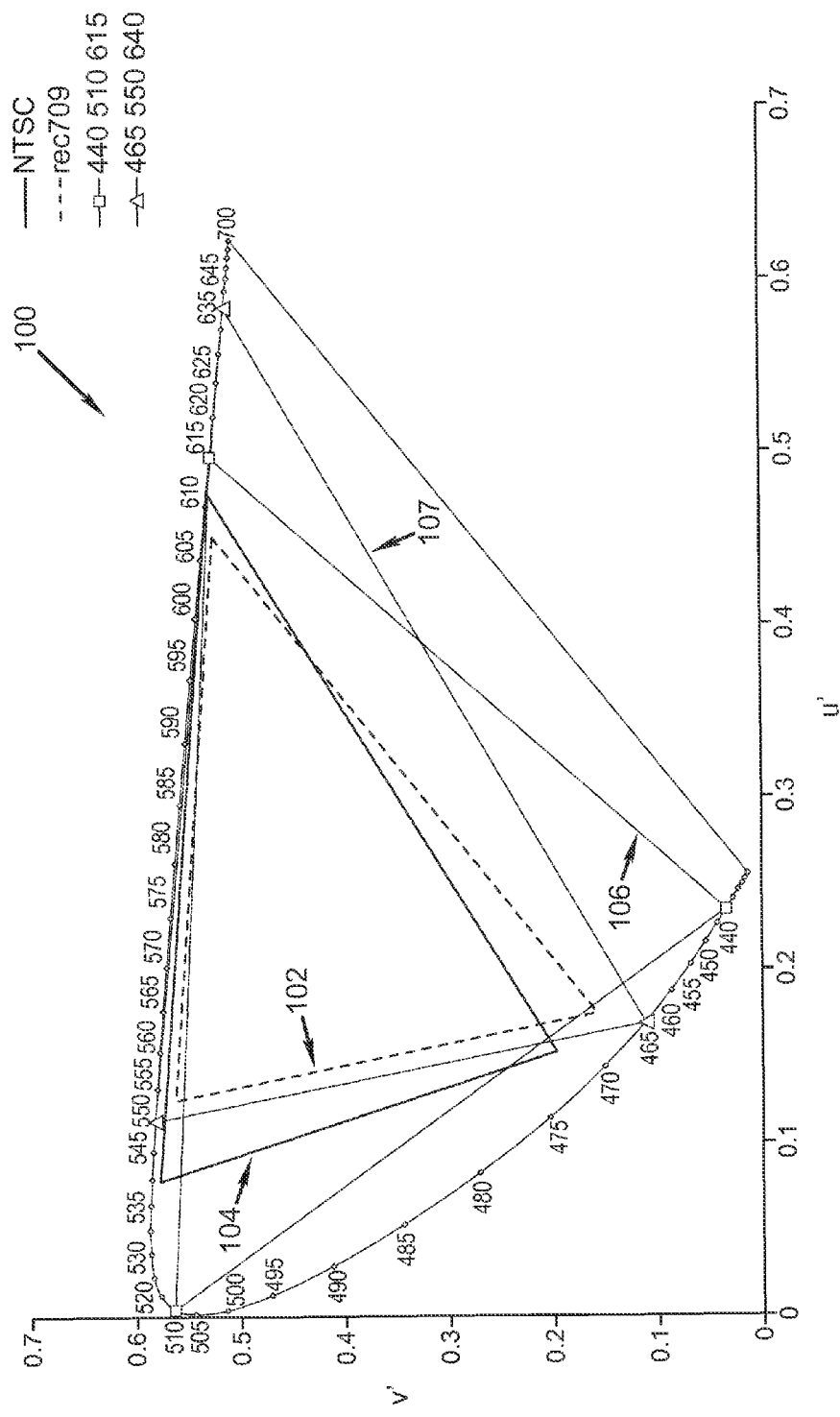
FIG. 8 is a graph showing the locations of the primaries for one embodiment of the present invention on a CIE u'v' chromaticity diagram.

In order to better understand the 2D/3D switchable display system of the present invention, it is useful to understand how the emitters 400, 405 are used to define the gamut for each of the viewing modes, 2D and 3D. Referring now to FIG. 8, it is instructive to note that the quantification of gamut for various systems is the area of the projection u'v' plot. For example, the NTSC gamut is defined as the area of the NTSC triangle 104 on the u'v' uniform chromaticity scale diagram of FIG. 8. Also in FIG. 8 are the individual gamuts 106, 107 for each set of emitters 400, 405. As shown in FIG. 8, the gamut of the first set of emitters 106 is illustrated using a square symbol and the emitters 400 have peak emission at 440, 510 and 615 nm. As shown in FIG. 8 the gamut 107 of the second set of emitters 405 is illustrated using a triangle symbol. The second set of emitters 405 have peak emission at 465 550 and 640 nm. In general, a basic strategy for expanding the gamut of a display is to use color sources that are on or close to the periphery of the visible gamut horseshoe. Lasers provide ideal spectrally pure sources of high color saturation that can be mapped directly to points lying on the horseshoe curve of visible gamut 100. LEDs, while they exhibit lower levels of spectral purity and brightness, are substantially cheaper and can provide sufficient brightness for illuminating modest size display areas, are also suitable for displays in the consumer market.

Figure 9:
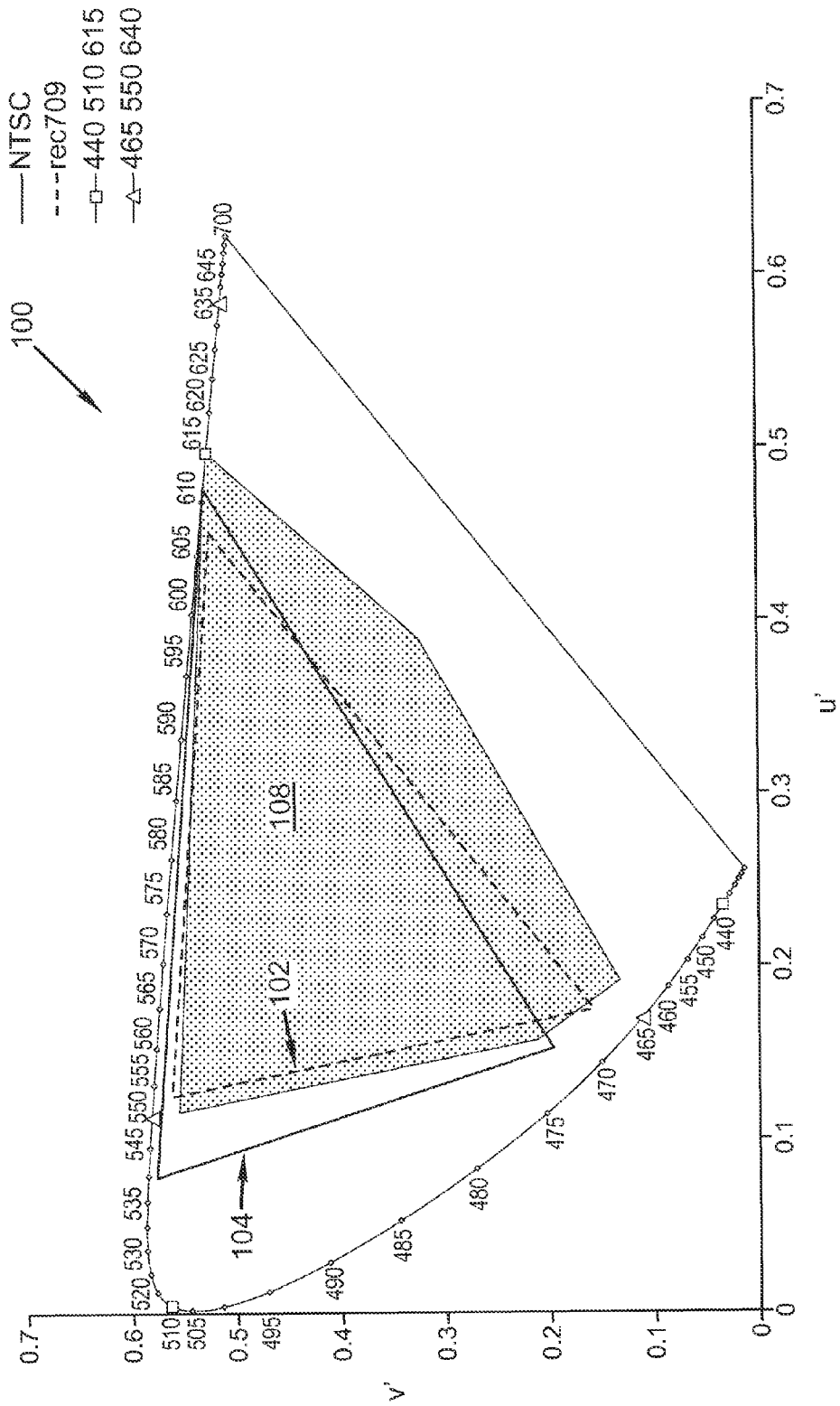
FIG. 9 is a graph showing the intersection gamut of the primaries of FIG. 8.

In order to avoid objectionable color differences between stereo channels in 3D operation, it is preferred to use only that portion of the available gamut that is common for the two sets of emitters. This gamut will be referred to as the intersect gamut, as it is the mathematical intersection of the gamuts corresponding to each individual set of emitters. FIG. 9 illustrates the intersect gamut 108 for the primaries shown in FIG. 8. In some embodiments, to simplify the image processing, it is possible to only use a portion of the intersect gamut defined by a triangle or other simple geometric figure contained within the boundaries of the intersect gamut. For example, limiting the 3D gamut shape to a triangle allows for linear transformations of the input image signal in order to appropriately drive the emitters, but limits the 3D performance of the system. Preferably, in 3D operation the display system will take advantage of the entire intersect gamut.

Figure 10:
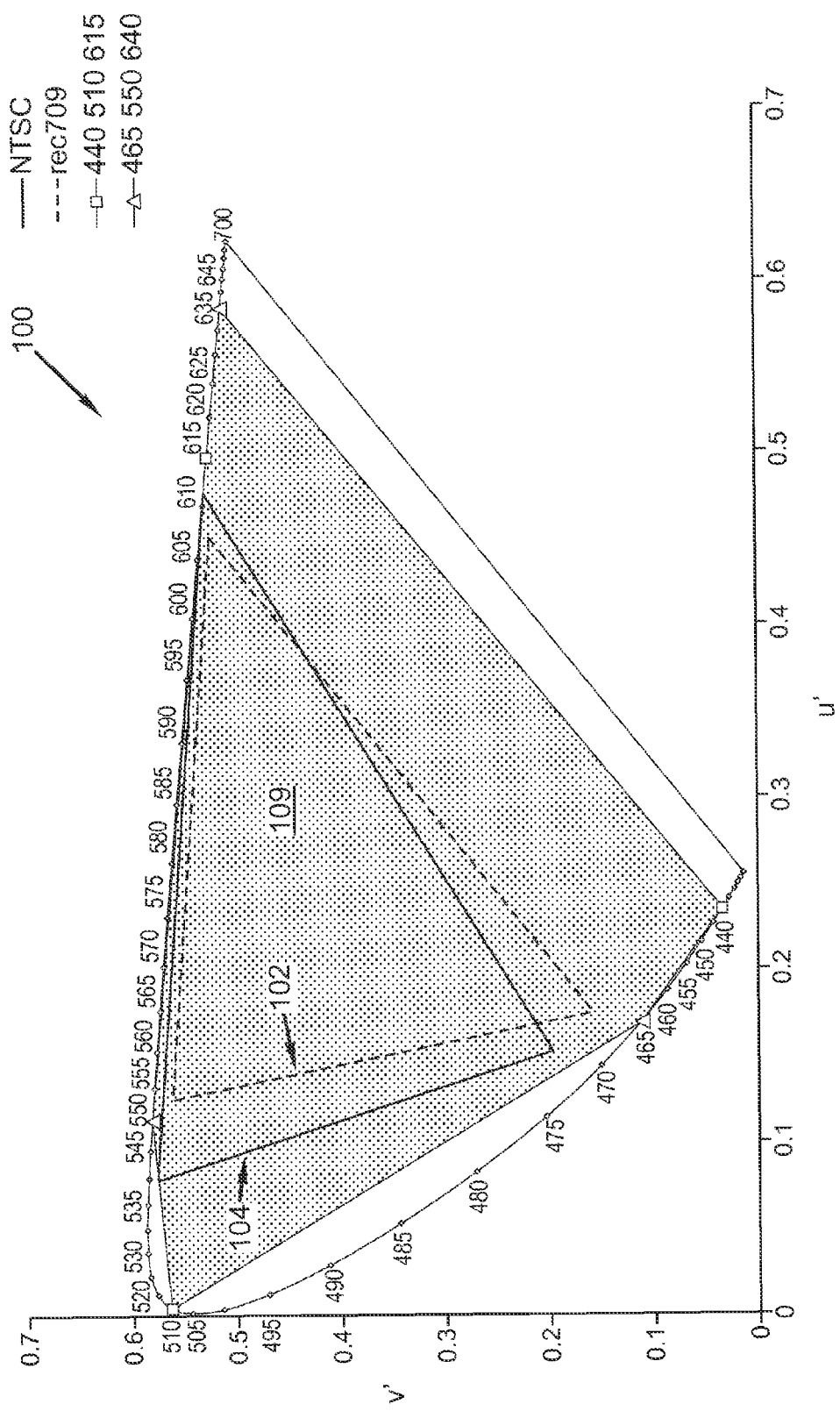
FIG. 10 is a graph showing the union gamut of the primaries of FIG. 8.

In an exemplary embodiment of the present invention, the entire available gamut, using the six emitters, is utilized in 2D operation in order to maximize the 2D display gamut. This gamut will be referred to as the union gamut, as it is the mathematical union of the gamuts corresponding to each individual set of emitters. FIG. 10 illustrates the union gamut 109 for the primaries shown in FIG. 8. Preferably the 2D gamut of the system is greater than the gamut defined by any single set of primaries R1G1B1 400 or R2G2B2 405.

The above discussion notes how the gamut will be utilized once the emitters have been chosen. In order to choose the emitter placement in chromaticity space for a 2D/3D display system, it is useful to calculate the luminous efficacy of the emitters, the intersect gamut, the union gamut and the cross-talk between stereo channels. The cross-talk is quantified by a parameter that will be defined later.

Figure 2B:
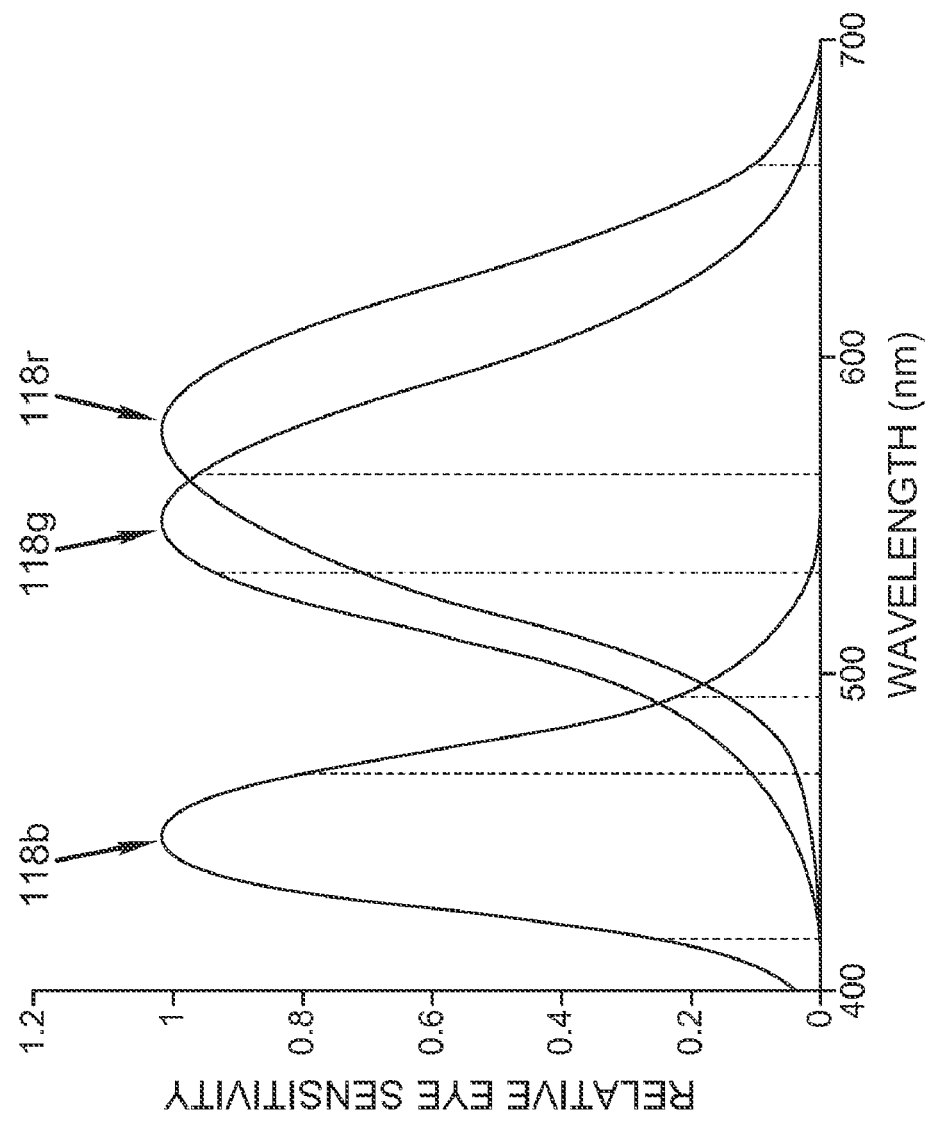
FIG. 2b are cone sensitivity curves known in the prior art.
Figure 4:
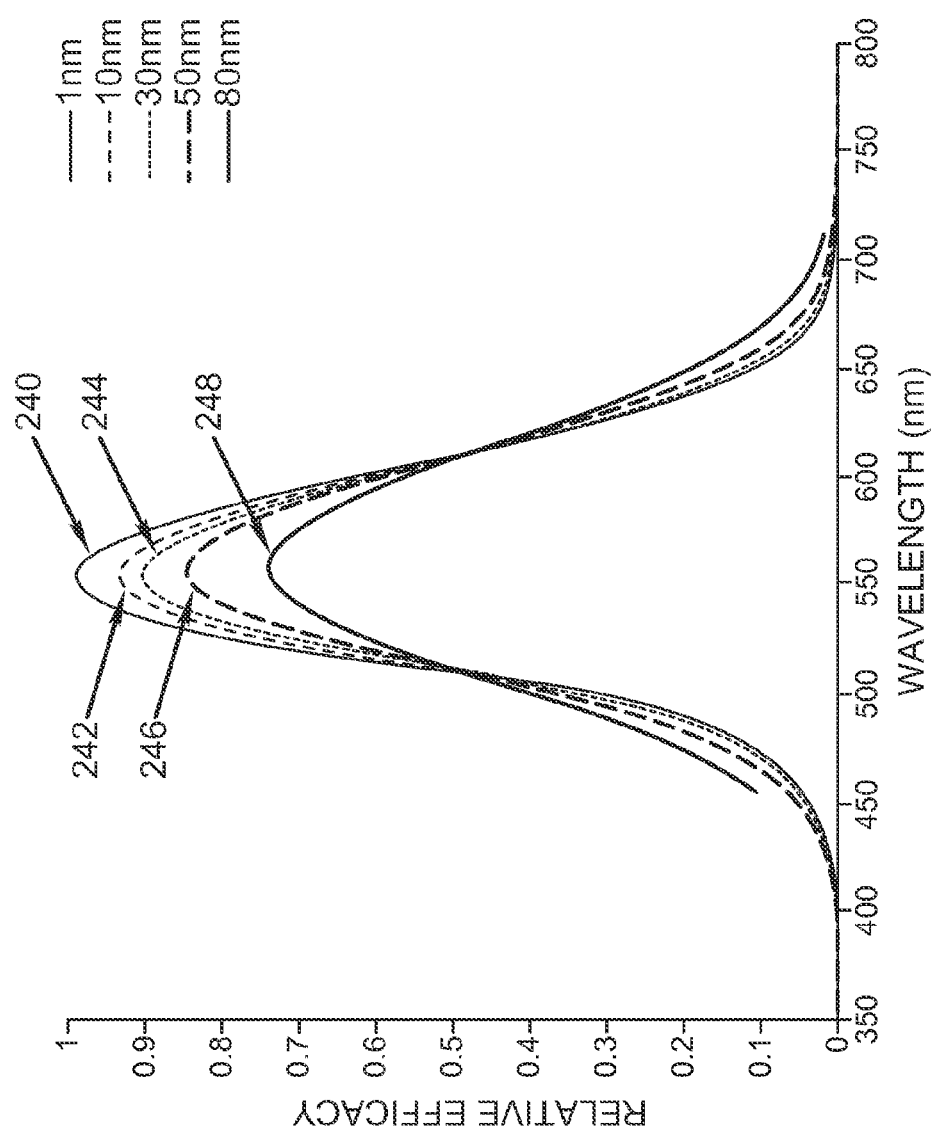
FIG. 4 is a plot of relative luminous efficacy vs. wavelength for a series of model quantum dot emitters.

First, the luminous efficacy of the emitters is examined, and this information combined with the desired color gamut and cross-talk constraints. FIG. 4 shows the relative luminous efficacy vs. dominant wavelength of five hypothetical distributions of emitters, all having spectral shapes as shown in FIG. 3. The FWHM values of these emitters are 1 nm for curve 240, 10 nm for curve 242, 30 nm for curve 244, 50 nm for curve 246, and 80 nm for curve 248. The relative luminous efficacy is taken as the Y tristimulus value calculated for the spectral curve of a given dominant wavelength and FWHM, divided by the Y tristimulus value of a monochromatic emitter of the same dominant wavelength. As the plot demonstrates, the highest efficacy is found near the peak of the visual sensitivity near 550 nm, as expected. Broadening of the emitter spectra, i.e. larger FWHM values, leads to lower peak and overall efficacy, as energy is spread to wavelengths where the eye is less sensitive, as illustrated in FIG. 2b. Therefore in general, broader emitters will lead to both reduced peak efficacy and lower color gamut, since they also produce less saturated colors. Note that in the plot, curve 248 is truncated; due to the relatively large bandwidth, dominant wavelengths beyond certain upper and lower limits lead to emitter spectra that extend well outside the visible range and hence are neither efficient nor good for color gamut. We conclude from FIG. 4 that, assuming equal internal efficiencies, the most efficient emitters will be those whose dominant wavelengths are as close to the visual peak as possible, and as narrow as practical. They will generate more lumens per Watt of optical power, and thus will be brighter for the same amount of electrical power, at constant quantum efficiency. Therefore, it is desirable to have at least one emitter whose dominant wavelength is close to the visual peak.

In addition to the luminous efficacy of the emitters, the radiant power required by a display system to display a white of a given luminance is a useful way to characterize the display performance. In this application, a reference white luminance of 100 cd/m$^2$ is used to compare the power consumption of various emitter sets. The radiance (W/(sr·m$^2$)) for each set of emitters 400, 405 can be easily calculated from the spectral power distribution for each set of emitters and any given white point, and in this disclosure will be used as a metric of power consumption, hereafter referred to as power. The power of the 2D/3D switchable display system in 3D operation is the sum of the power of the two sets of emitters. It should be noted that depending on the driving method, the power of the 3D operation may be represented as the average of the emitter powers (luminances). For purposes of comparison, the sum will be used as it differs from the average only by a scale factor. For 2D operation, the power can be estimated by the minimum power possible for any three primary combination of the available six primaries. In designing a 2D/3D switchable display system it is desirable to have reasonable power numbers. In some instances, it is preferable to trade lower power for other display attributes.

Next, turning to the issue of display gamut, it should be recognized that the placement of the intersect gamut and union gamut with in the uniform chromaticity space is as relevant as the area of these gamuts when designing high quality displays. The National Television Standards Committee (Recommendation ITU-R BT.470-7, Conventional Analog Television Systems; hereafter, NTSC) High Definition Television (International Telecommunication Union, Recommendation ITU-R BT.709-5 (04/02); hereafter, Rec. 709) color gamuts are both recognized in the industry as standards for gamut performance. It is, therefore, desirable for a 2D/3D switchable display system to have intersect and union gamuts that cover the NTSC or Rec. 709 gamut triangles. The Rec. 709 color triangle may be considered representative of what consumers have become used to seeing in their homes. It would, therefore, be advantageous to be able to reproduce most of the Rec. 709 color triangle in both 2D and 3D operation. Although similar in area, the position of the NTSC color triangle covers more green and cyan colors than the Rec. 709 triangle, and the union of the NTSC and Rec 709 gamuts would represent a gamut larger and better positioned than either taken individually. Therefore, it would be advantageous to be able to reproduce most of both the NTSC and Rec. 709 colors in 2D operation in order to improve the consumer viewing experience. Additionally, any additional gamut area above and beyond the NTSC and Rec. 709 gamuts would be desirable to improve the 2D/3D switchable display system performance.

Ideally, the wavelengths of the first set of emitters 400 would not overlap with the wavelengths of the second set of emitters 405, to provide complete discrimination between the right eye and left eye images in 3D mode. Realistically, for emitters other than lasers there may be some level of spectral overlap, leading to stereo channel cross-talk. The level of cross-talk (C) in 3D operation can be calculated using Equation (1).

$$C = \frac{\int s_1(\lambda)s_2(\lambda)d\lambda}{\sqrt{\int s_1^2(\lambda)d\lambda \int s_2^2(\lambda)d\lambda}} \quad \text{Equation (1)}$$

where $s_1$ is the spectrum of the first set of emitters 400, and $s_2$ is the spectrum of the second set of emitters 405. A practical 2D/3D switchable display system will have image cross-talk (C) less than 10%. Preferably, the cross-talk is less than 5%, more preferably less than 1%.

In order to investigate the design space for a 2D/3D switchable display system, a variety of first and second emitters were modeled for gamut, power and cross-talk. Table 1 contains the peak wavelengths for a sampling of the emitters modeled; each emitter was assumed to have a Gaussian distribution with a FWHM of 10 nm. Sample A is a set of model primaries having a Gaussian spectral distribution and FWHM=10 nm, with peak wavelengths matching those of the prior art Infitec primaries.

TABLE 1

| Sample ID | First set of emitters | | | Second set of emitters | | | Minimum Power emitter set for 2D | | |
|---|---|---|---|---|---|---|---|---|---|
| | b1 | g1 | r1 | b2 | g2 | r2 | b3 | g3 | r3 |
| A | 432 | 518 | 615 | 446 | 532 | 629 | 446 | 532 | 615 |
| B | 430 | 540 | 635 | 445 | 555 | 650 | 445 | 555 | 635 |
| C | 430 | 510 | 620 | 450 | 530 | 640 | 450 | 530 | 620 |
| D | 425 | 505 | 625 | 450 | 530 | 650 | 450 | 530 | 625 |
| E | 430 | 520 | 625 | 452 | 535 | 645 | 452 | 535 | 625 |
| F | 440 | 510 | 615 | 465 | 550 | 640 | 440 | 550 | 615 |

In many discussions about optimizing display gamut, the intention is to maximize the gamut area without regard to the location in chromaticity space. Table 2 illustrates the gamut performance of the samples of Table 1 as a percentage of NTSC area, with no regard to the overlap with the NTSC triangle.

TABLE 2

| Sample ID | ntsc3D | Ntsc2D |
|---|---|---|
| A | 154 | 196 |
| B | 156 | 193 |
| C | 158 | 216 |
| D | 160 | 228 |
| E | 164 | 213 |
| F | 123 | 218 |

As one can see from Table 2, all of the Samples of Table 1 have gamut areas greater than that of NTSC in both 2D and 3D operation. In fact, from the data in Table 2 is difficult to distinguish between the different options. Using the rationale discussed above, we can develop five independent criteria for rating the performance of different sets of emitters as seen in Table 3.

TABLE 3

| Criteria | Description | Impact |
|---|---|---|
| 1 | Intersection of the 3D gamut with the Rec. 709 triangle is greater than or equal 95% | 3D operation with good display gamut |
| 2 | Intersection of the 2D gamut with the NTSC triangle is greater than or equal 95% AND Intersection of the 2D gamut with the Rec. 709 triangle is greater than or equal 95% | 2D operation with improved color reproduction |

TABLE 3-continued

| Criteria | Description | Impact |
|---|---|---|
| 3 | Cross-talk metric is less than 5% (as calculated using Equation (1)) | Good left eye/right eye channel separation in 3D operation |
| 4 | 2D power at D65 is less than 210 W/(sr·m$^2$) | Low power 2D display for every day use |
| 5 | 3D power at D65 is less than 600 W/(sr·m$^2$) | Reasonable 3D power to minimize power consumption and heat |

The sets of emitters may be evaluated against how many of the criteria they meet. It is preferable that the emitters meet at least one of the criteria in Table 3. It is even more preferred that the emitters to meet two or more criteria. Most preferred, the emitters would meet all five of the criteria in Table 3. Ultimately, it will be up to the designer to determine how to trade off performance between these criteria. It is worth noting that the criteria in Table 3 represent the minimum criterion for designs aimed at achieving the impact indicated. It is more preferred that the intersection of the 3D gamut with the Rec. 709 triangle is 100%. It is more preferred that the intersections of the 2D gamut with the Rec. 709 triangle and NTSC triangle are 100%. Additionally, it is preferred that the crosstalk (C) is less 1%, more preferably under 0.1%. Table 4 has the performance of the Samples of Table 1, judged against the criteria of Table 3 when using the full intersection (3D) and union (2D) gamuts for each Sample ID of emitters.

TABLE 4

| Sample ID | Total # Criteria Met | Criteria Ref. # | 3D Rec. 709 intersection | 2D Rec. 709 intersection | 2D NTSC intersection | 3D power | 2D power | cross-talk (C) |
|---|---|---|---|---|---|---|---|---|
| A | 3 | 1, 2, 5 | 99.3 | 99.9 | 99.3 | 506 | 217 | 6.60 |
| B | 2 | 3, 5 | 87.9 | 98.1 | 91 | 537 | 216 | 4.40 |
| C | 4 | 1, 2, 3, 5 | 98.2 | 100 | 99.9 | 584 | 229 | 3.90 |
| D | 2 | 3, 3 | 93.5 | 100 | 99.9 | 742 | 240 | 0.02 |
| E | 3 | 1, 2, 3 | 99.4 | 100 | 99.6 | 601 | 232 | 1.60 |
| F | 5 | 1, 2, 3, 4, 5 | 98.6 | 100 | 100 | 538 | 198 | 0.01 |

As seen from Table 4, Sample F is the best performer as judged by the design criteria of the present invention, but when the same samples were judged only on gamut area relative to the NTSC gamut area Sample F was a poor performer (see Table 2).

Projection System 1

Figure 11A:
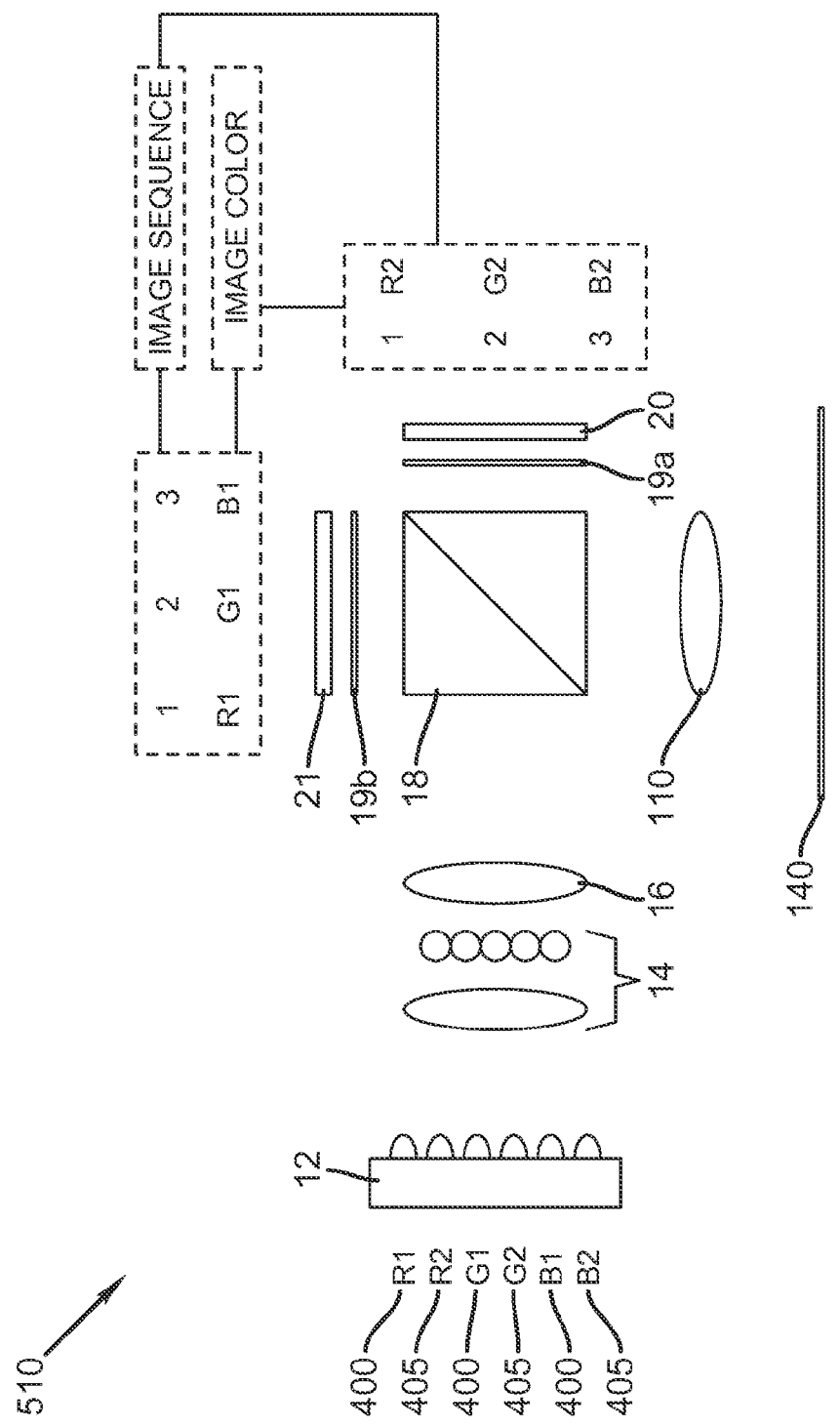
FIG. 11a is a schematic block diagram showing a six-color display system using a single LED array and two spatial light modulators.

Referring to FIG. 11a, there is shown a projection display system 510 of the present invention, having a modulation path for each of six emitters, which make up the first and second emitters 400,405. In FIG. 11a and following, the color of each modulation path is indicated as follows: R1 for the first red modulation path, R2 for the second red path, G1 for the first green path, G2 for the second green path, B1 the first blue path, and B2 for the second blue path. Similarly, numbered components specific to a color modulation path may be labeled, where necessary, using an appended r1, r2, g1, g2, b1, b2. For the purpose of the following description, however, the appended letter is omitted, except where necessary to indicate activity distinctive to a particular color path.

With reference to FIG. 11a, light modulation for each emitter is similar. Light source 12, a multicolor LED array in one embodiment, provides the source illumination that is modulated. Uniformizing optics 14 and a telecentric condenser lens 16, which may be an individual lens, but is more likely a set of lenses, directs the light toward a spatial light modulator 20 through a beamsplitter 18. To block unwanted light, bandpass filters 19a and 19b are positioned between polarizing beamsplitter 18 and each spatial light modulator 20 and 21. As shown in FIG. 11b, bandpass filter 19a transmits the first set of primaries (R1, G1, B1) and blocks the second set of emitters (R2, G2, b2). As is shown in FIG. 11c, bandpass filter 19b is the complement of bandpass filter 19a, transmitting the second emitters 405. Spatial light modulator 20 sequentially modulates R1, G1, B1 light, preferably in that order, while spatial light modulator 21 sequentially modulates R2, G2, B2 light. In the preferred embodiment, spatial light modulator 20 or 21 is a reflective LCD. Spatial light modulators 20, 21, provide selective, variable rotation of light polarization for each individual pixel, as is well known in the imaging arts, to modulate incident light and provide a modulated color beam. Also acting as a combiner, beamsplitter 18 reflects the modulated light from spatial light modulator 20 and transmits the modulated light from spatial light modulator 21 toward a projection lens 110, which then directs the combined colored modulated light onto a display surface 140. The display surface 140 could be an opaque glass-beaded screen typical of slide and movie projection, or, more likely, it is a rear projection screen intended for direct viewing.

FIG. 11a shows one possible arrangement of color modulation paths. It is instructive to note that other criteria for pairing colors could be used. For example, colors could be paired in order to minimize changes in setup voltage on a given spatial light modulator 20, 21. To do this, colors close in wavelength would be sent to each spatial light modulator 20, 21 such that the setup voltage change from color to color would be minimal, minimizing the settle time. Colors would be paired according to the polarization state of each light source 12 that is modulated, in order to balance the modulation load and timing between spatial light modulators 20 and 21.

The exemplary embodiment of FIG. 11a admits a number of alternative types of components for performing the various light conditioning, modulation, and polarization handling functions. As was stated above, the emitters of light source 12 are preferably LEDs, however, other types of light sources could be used, such as lasers, for example. Important characteristics for light source 12 include relatively high spectral purity (i.e. narrow spectral bandwidth) of the individual emitters, high brightness level, and correct polarization state when using an LCD as spatial light modulator 20, 21.

Uniformizing optics 14 can include any of a variety of lenslet arrays, integrating bar, integrating tunnel, such as the LightTunnel™ available from Unaxis Optics, Liechtenstein, or other optical components suitable for providing illumination over a sufficiently wide field for spatial light modulator 20, 21. In an exemplary embodiment, for the illumination beam that is provided through uniformizing optics 14, the width:height aspect ratio corresponds to the width:height aspect ratio of the modulating surface of spatial light modulator 20, 21. This arrangement provides the most efficient use of light and helps to provide a uniform or homogeneous field.

Spatial light modulators 20 and 21 as used in the apparatus of FIG. 11a are reflective LCDs. Alternative types of devices could serve as the spatial light modulator 20, 21. For example, a transmissive LCD could be used. With a transmissive LCD, light source 12 would be positioned to transmit light, conditioned by uniformizing optics 14 and condenser lens 16, through spatial light modulator 20, 21. There would be no need for polarizing beamsplitter 18 with a transmissive LCD. As another alternative, a digital micromirror (DMD) or similar device could be employed as spatial light modulator 20, 21. Using a DMD, polarization-conditioning components would not be required. Rather than modulate using polarization, the DMD modulates by reflecting incident light at an angle, as is shown in U.S. Pat. No. 5,905,545, cited above. Methods for directing source light to DMDs are familiar to those skilled in the digital projection arts.

Projection System 2

Figure 12A:
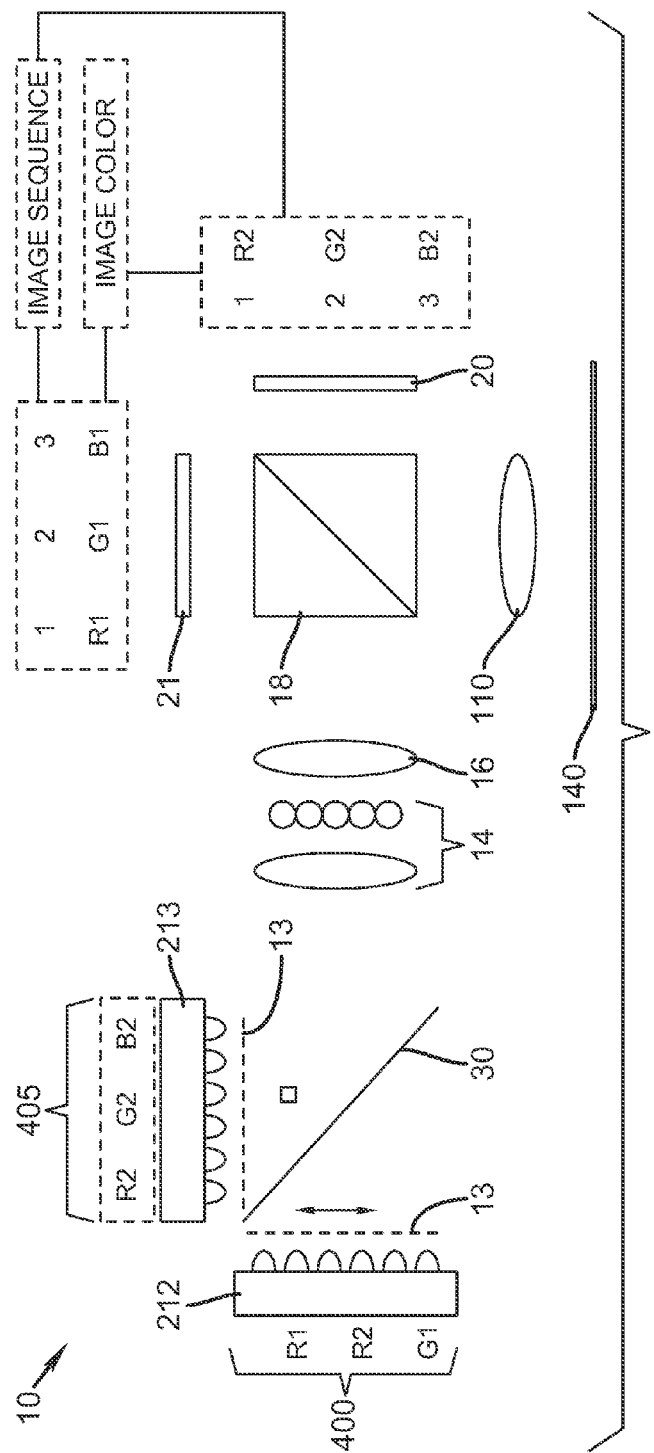
FIG. 12a is a schematic diagram showing a six-color display system using two LED arrays and two spatial light modulators.
Figure 12B:
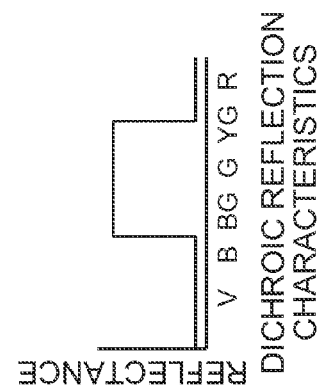
FIG. 12b shows the dichroic combiner reflectivity.

FIG. 12a shows an alternative embodiment of display system 10 that provides improved brightness using first and second LED arrays 212 and 213 and two LCD spatial light modulators 20, 21. As in the embodiment of FIG. 11a, two LCD spatial light modulators 20, 21 allow faster projection of all the colors and the pairing of colors to minimize flicker. First LED array, 212 includes first emitters 400 (R1, G1, B1) red, green and blue LEDs, which have p-polarization (symbolized by the arrow) using a polarizer 13. Alternatively, second LED array 213 includes second emitters 405 (R2, G2, B2) red, green, and blue LEDs, which are polarized to s-polarization by a second polarizer 13. The two source beams are combined by a dichroic combiner 30 and conditioned by uniformizing optics 14 and condenser lens 16. The reflectivity characteristic of dichroic combiner 30 is shown in FIG. 12b. Returning to FIG. 12a, the light is then directed to spatial light modulators 20 and 21 depending on polarization. The p-polarized light is transmitted to spatial light modulator 20 that modulates, in sequence, the R1, G1, B1 images. The s-polarized light is reflected to spatial light modulator 21, which modulates, in sequence, the R2, G2, B2 light. The polarization of the light is rotated by the color image signal impressed on spatial light modulator 20 or 21 at the time the appropriate LED from first or second LED array 212 or 213 is turned on. This image bearing beam is then directed by polarizing beamsplitter 18 to projection lens 110 and to projection screen 140.

Projection System 3

There is yet another embodiment of display apparatus 510 using six colors (not shown), which should be understood with respect to the descriptions of the previous figures. In this embodiment, there are six LED arrays, one of each color corresponding to the six emitters of the first and second emitters 400, 405. Correspondingly, this alternative embodiment has six spatial light modulators, one for each LED array. Within each color path are provided uniformizing optics as well as condenser lens and polarizers. In each color path, a polarizing beamsplitter directs light to the corresponding spatial light modulator. Dichroic combiners and the X-cube combine the modulated color output to provide the complete, six-color image on display surface 140. The most complex of the embodiments presented, this arrangement should offer the advantage of a flicker-free display along with the optimum speed and brightness. In addition, each spatial light modulator can be tuned for optimum performance for each color, without the need for settle-time to adjust device bias voltages between colors. It is anticipated that a future benefit of HDTV development will be a substantial reduction in LCD device cost, making the arrangement more practical and economical in consumer products.

Projection System 4

An electromechanical conformal grating device consisting of ribbon elements suspended above a substrate by a periodic sequence of intermediate supports was disclosed in U.S. Pat. No. 6,307,663 issued Oct. 23, 2001 to Kowarz, entitled, "Spatial Light Modulator With Conformal Grating Device," which is hereby incorporated by reference in its entirety. The electromechanical conformal grating device is operated by electrostatic actuation, which causes the ribbon elements to conform around the support substructure, thereby producing a grating. The device of U.S. Pat. No. 6,307,663 has more recently become known as the conformal GEMS device, with GEMS standing for Grating ElectroMechanical System. The conformal GEMS device possesses a number of attractive features. It provides high-speed digital light modulation with high contrast and good efficiency. In addition, in a linear array of conformal GEMS devices, the active region is relatively large and the grating period is oriented perpendicular to the array direction. This orientation of the grating period causes diffracted light beams to separate in close proximity to the linear array and to remain spatially separated throughout most of an optical system. When used with laser sources, GEMS devices provide excellent brightness, speed, and contrast.

U.S. Pat. No. 6,411,425 issued Jun. 25, 2002 to Kowarz et al. discloses an imaging system employing GEMS devices in a number of printing and display embodiments, and is also hereby incorporated by reference in its entirety A GEMS device modulates a single color and a single line of an image at a time. Thus, forming a color image requires suitable techniques either for sequencing illumination and modulation data for each color to a single linear modulator, or for combining separately modulated color images. With conventional RGB color systems, various techniques have been developed and used for color-sequential image-forming using three colors as well as for combining three separately modulated images. However, it can be appreciated that there are significant challenges in adapting these devices to a color display system that is 2D/3D switchable.

Figure 13:
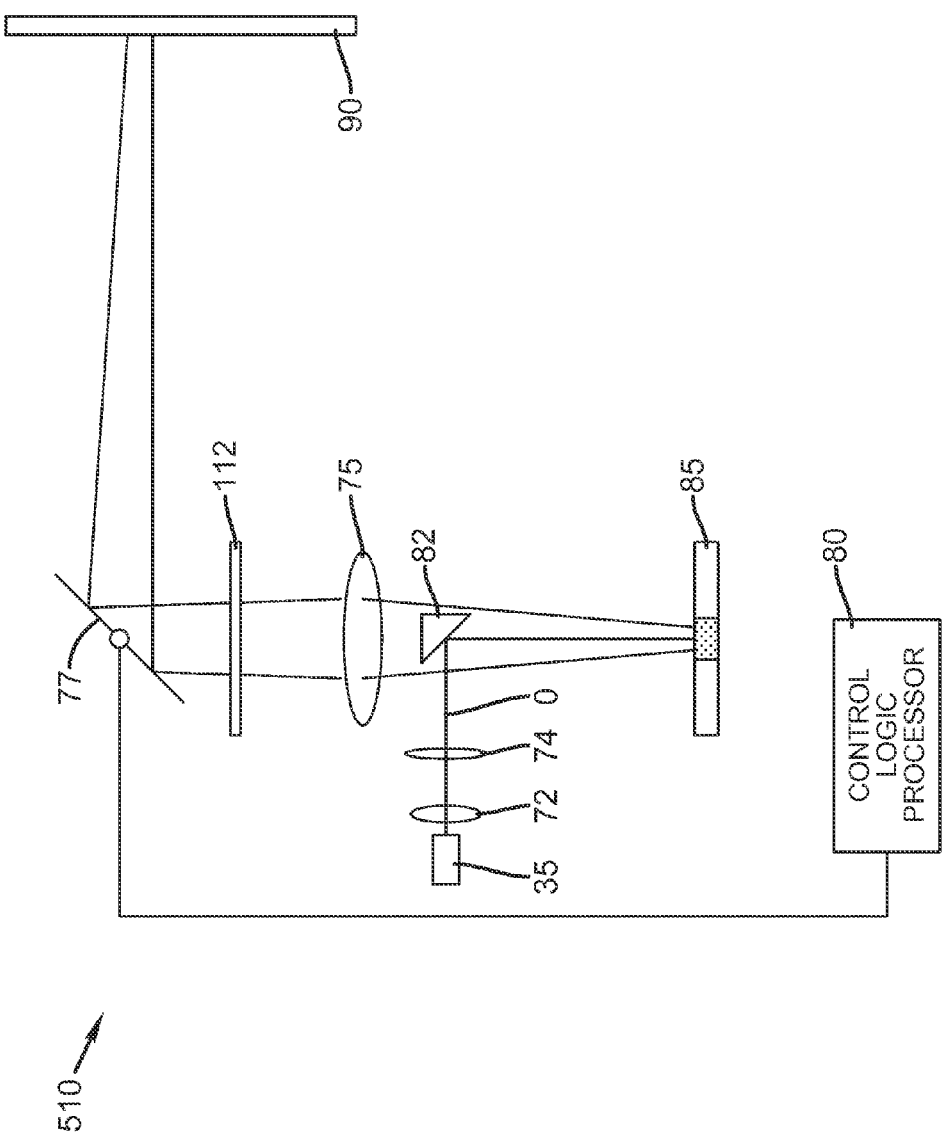
FIG. 13 is a schematic diagram showing the basic components for a display apparatus using conformal GEMS devices for image modulation.

Referring first to FIG. 13, display apparatus 510 shows the basic arrangement of components for forming and projecting an image using a linear array of conformal GEMS devices 85. A light source 35 provides illumination that is conditioned through a spherical lens 72 and a cylindrical lens 74 and directed toward a turning mirror 82. Light reflected from turning mirror 82 is modulated by diffraction at the linear array of conformal GEMS devices 85. Modulated diffracted light from the linear array of conformal GEMS devices 85 is diffracted past turning mirror 82 and directed by a lens 75 to a scanning mirror 77. Turning mirror 82 acts as an obstructing element for the zeroth order reflected light from the linear array of conformal GEMS devices 85.

As scanning mirror 77 rotates, individual modulated line images from a linear array of conformal GEMS devices 85 form a two-dimensional image on a display surface 90. A control logic processor 80 provides image modulation data, line by line, to an electromechanical grating light modulator 85 based on the position of scanning mirror 77. Optionally, control of light source 35 can also be provided by control logic processor 80. For high optical efficiency and high contrast in one embodiment, the projected line of the image formed on display surface 90 is preferably formed from two or more diffracted orders of the modulated light from the linear array of conformal GEMS devices 85. Display surface 90 is a front projection screen in one embodiment; however, similar structure and operation would be used for a rear projection surface such as a backlit display panel or other viewing surface.

An optional cross-order filter 112 can be placed near a Fourier (focal) plane of lens 75 to minimize projection of undesirable diffracted cross-orders in the modulated light. Scanning mirror 77 can be appropriately sized so that diffracted cross-order components of modulated light are directed outside its working area; this allows scanning mirror 77 to be functionally equivalent to cross order filter 112 for rejecting specific diffracted orders.

Figure 14:
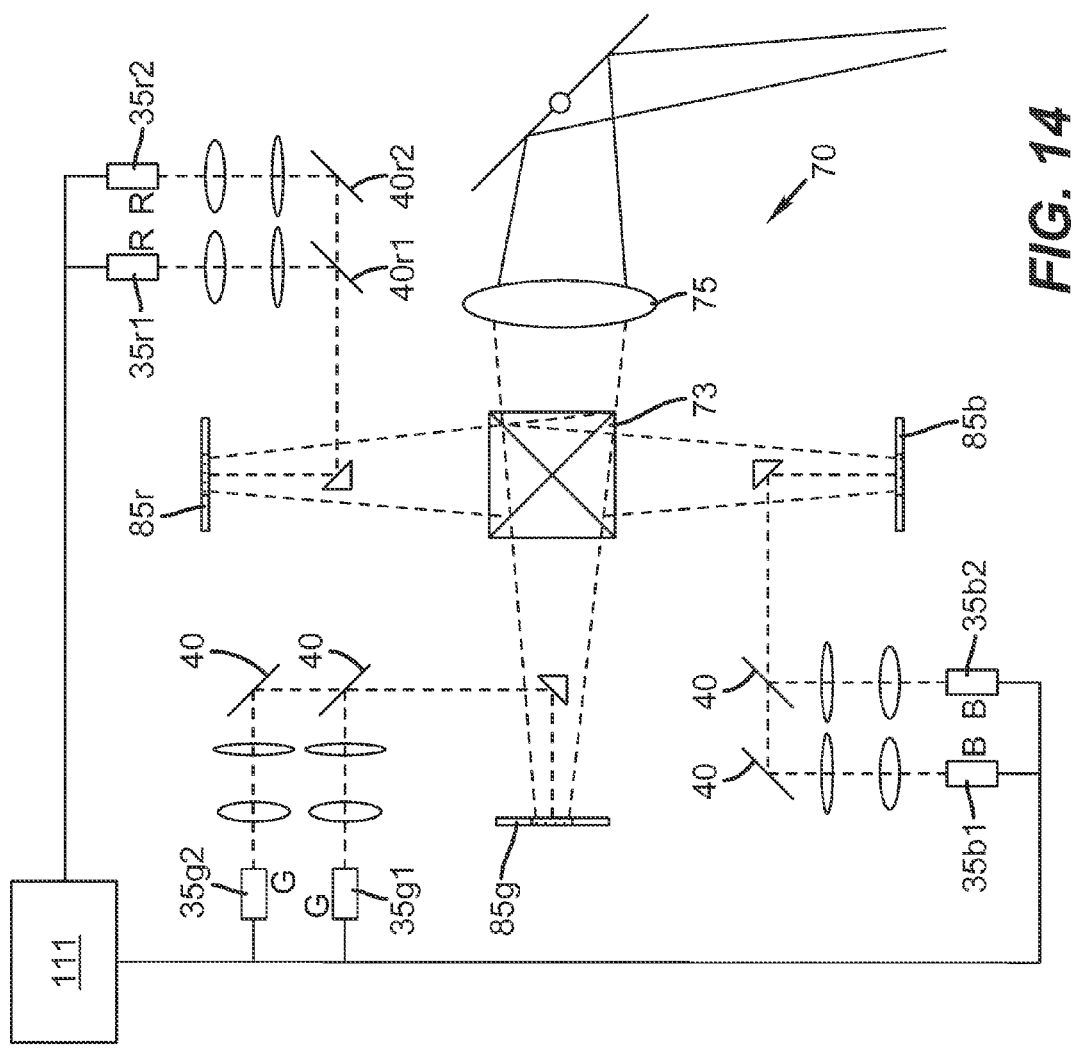
FIG. 14 is one embodiment of a 2D/3D switchable GEMs display system.
Figure 15:
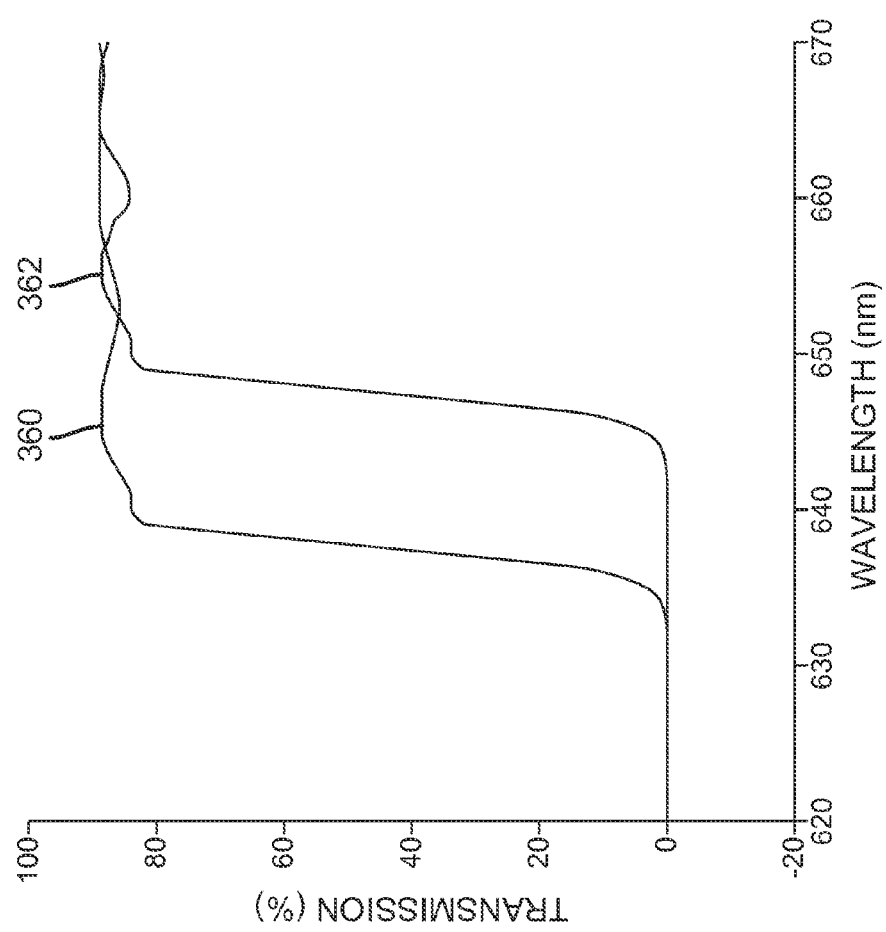
FIG. 15 is a graph showing characteristic filter response over a narrow range of wavelengths that is utilized for the arrangement of FIG. 14.

A 2D/3D switchable display employing a linear array of conformal GEMS devices preferably has six laser sources corresponding to the six emitters of the first and second sets of emitters 400,405. Referring now to FIG. 14, a 2D/3D switchable display system 70 is shown using the GEMs technology. Display system 70 has red, green, and blue GEMS devices 85r, 85g, and 85b. Referring specifically to the red path, there are two red light sources 35r1 and 35r2 where 35r1 is R1 of the first set of emitters 400 and 35r2 is R2 of the second set of emitters 405. In this example, the convention will be used where the wavelength range of R1 is shorter than that of R2. Dichroic filters 40r1 and 40r2 are used to combine the light from the red light sources 35r1 and 35r2 onto a single path for modulation by GEMS devices 85r. In order to provide this function, it is necessary to match the output wavelengths of individual light sources 35r1 and 35r2 with the filter characteristics of corresponding dichroic filters 40r1 and 40r2. Referring to FIG. 15, there is shown a series of representative response curves 240a and 240b for dichroic filters 40r1 and 40r2 respectively. Curves 240a and 240b plot filter transmission, as a percentage, against wavelength. Using this principle, as shown in FIG. 14, dichroic filter 40r1 reflects light from light source 35r1 and transmits light from light source 35r2. Similarly, dichroic filter 40r2 reflects light from light source 35r2 and could be designed to transmit light from one or more additional sources 35. Where light source 35r2 is the last in the series, a mirror could be substituted for dichroic filter 40r2 or light source 35r2 could be positioned to transmit directly through dichroic filter 40r1. This pattern requires that light sources 35r1 and 35r2 be sorted according to their different wavelengths, varying from each other significantly enough to allow selective reflectance and transmission by dichroic filters 40r1 and 40r2. Referring back to the example graph of FIG. 14, dichroic filter 40r1, matched to the output wavelength of light source 35r1, has the transmission response of curve 360 (in FIG. 15). This allows dichroic filter 40r1 to transmit red wavelengths of the R1 emitter and higher wavelengths with at least 80% efficiency. Dichroic filter 40r2, matched to the output wavelength of light source 35r2, has the transmission response of curve 362 (in FIG. 15). This allows dichroic filter 40r2 to transmit red wavelengths of the R2 emitter and higher wavelengths with at least 80% efficiency. Using this pattern, the dichroic filter 40r1 having the lowest wavelength response passes all higher wavelengths; each succeeding dichroic filter 40 may be more restrictive.

Referring back to FIG. 14, the green path and the blue path operate similarly to the red path. For the green path, there are two green light sources 35g1 and 35g2, where 35g1 is G1 of the first set of emitters 400 and 35g2 is G2 the second set of emitters 405. For the blue path, there are two blue light sources 35b1 and 35b2, where 35b1 is B1 of the first set of emitters 400 and 35b2 is B2 of the second set of emitters 405. Therefore, there are three different composite color paths with dichroic mirrors 40 guiding the light of each color for delivery to electromechanical grating light modulator 85.

The role of control processor 111, shown in FIG. 14 directs the operation of light sources 35r1, 35r2, 35g1, 35g2, 35b1, and 35b2 in a number of ways. Control processor 111 can control the sequencing of two separate light sources 35 that are directed to the same electromechanical grating light modulator 85, as is shown in FIG. 14. Control logic processor 111 can also control the intensity of source illumination within one or more color modulation paths. Control logic processor 111 can selectively control which lasers are energized in which color channel. Control logic processor 111 can alternately control the sequencing of two different color light sources 20 that are directed to the same electromechanical grating light modulator 85. In addition, control processor 111 may be programmed to select or inhibit the display of any color as desired, in order to optimize the viewing experience. Some types of scene content in 2D mode, for example, may benefit from being produced using only three colors. It must be pointed out that FIG. 14 shows only the components of display system 70 that are used for color modulation.

Control logic processor 111 can, therefore, be used to control the number of colors that are enabled and used for each individual pixel or scene frame that displays, allowing display system 70 to be switched between 3, 4, 5, 6, or more source colors, as needed, even within the same motion picture presentation, even between frames. Factors that can be used to determine whether or not additional colors on the vertices of the color gamut should be used include number of pixels for which enhanced color is useful, and the amount of difference between a desired color and the conventional RGB color gamut, for example.

Control logic processor 111 itself may be embodied in a number of ways. In a preferred embodiment, control logic processor 111 is a dedicated PC workstation, housed within display apparatus 70. Control logic processor 111 could alternatively be embodied using a dedicated microprocessor, a logic gate array, or similarly adaptable logic device, for example.

Flat Panel Display 1

Figure 16:
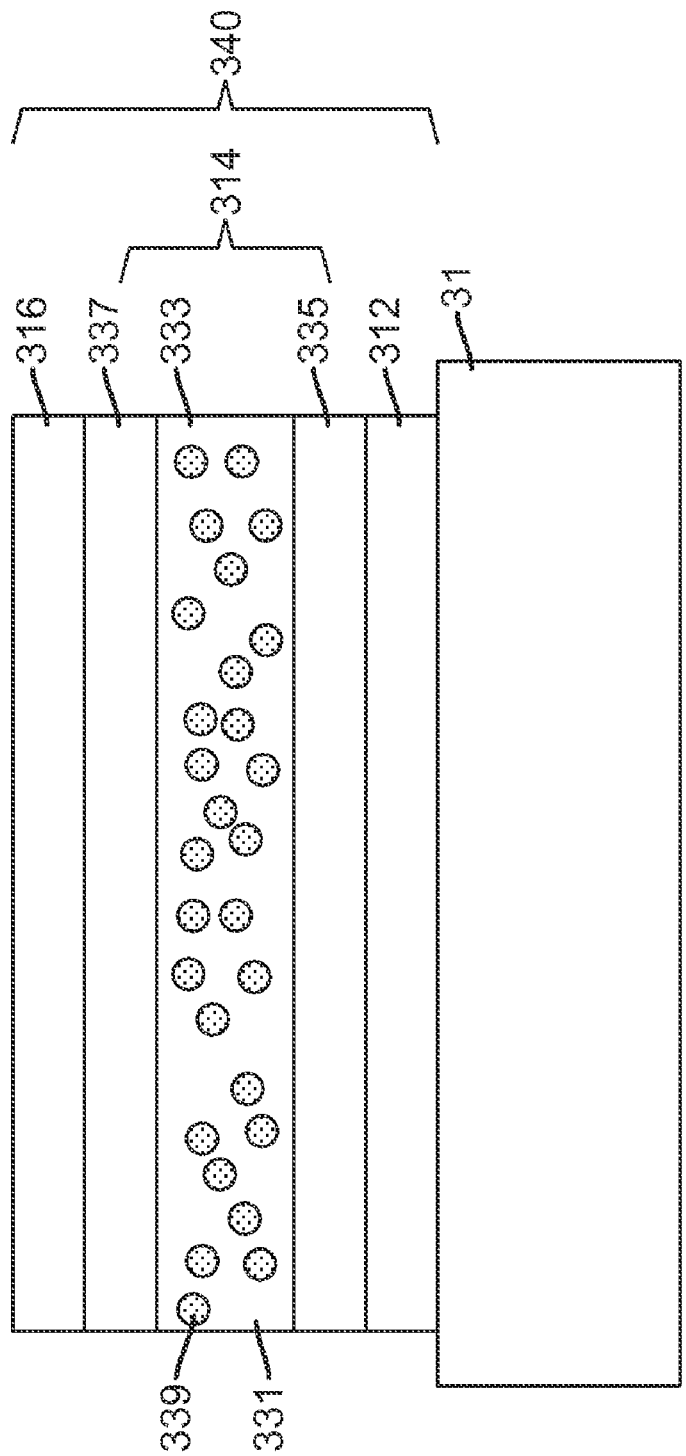
FIG. 16 is a schematic diagram showing the structure of a quantum dot light-emitting element.

As described with respect to FIG. 6 and FIG. 7, one preferred embodiment of the present invention is a flat panel 2D/3D switchable display system. One embodiment of the flat panel 2D/3D switchable display system uses thin film LEDs containing quantum dot emitters. FIG. 16 shows a typical LED 340 structure containing an electroluminescent (EL) unit 314 between a first electrode 312 and second electrode 316 and residing on a substrate 31. The EL unit 314 as illustrated contains all layers between the first electrode 312 and the second electrode 316, but not the electrodes 312 and 316 themselves. The light-emitting layer 333 can include any material that emits light by the recombination of holes and electrons. In one embodiment, illustrated in FIG. 12, light-emitting layer 333 contains light-emitting quantum dots 339 in a semiconductor matrix 331. Quantum dots as used in this disclosure are light-emitting, inorganic crystalline nanoparticles. As illustrated in FIG. 16, the quantum dots can be spherical but should not be limited to this shape. Light-emitting nanoparticles can have any shape, including spheres, rods and wires, so long as they are inorganic crystalline nanoparticles that have a length in at least one dimension of less than 100 nm. Preferably, the light-emitting nanoparticles exhibit quantum confinement effects, one consequence of which is that the wavelength of light emission is strongly dependent on their size. Semiconductor matrix 331 can be an organic host material in the case of hybrid devices, or a polycrystalline inorganic semiconductor matrix in the case of inorganic quantum dot LEDs. EL unit 314 can optionally contain p-type or n-type charge-transport layers 335 and 337, respectively, in order to improve charge injection. EL unit 314 can have additional charge-transport layers, or contact layers (not shown). One typical LED device uses a glass substrate, a transparent conducting anode such as indium-tin-oxide (ITO), an EL unit 314 containing a stack of layers, and a reflective cathode layer. The layers in the EL unit 314 can be organic, inorganic, or a combination thereof.

In a preferred embodiment, the present invention is employed in a flat panel inorganic LED device containing quantum dots as disclosed in, but not limited to U.S. Patent Application Publication No. 2007/0057263 entitled "Quantum dot light emitting layer" and pending U.S. application Ser. No. 11/683,479, by Kahen, which are both hereby incorporated by reference in their entirety. Flat panel displays with narrow emitters of different architectures can be used to fabricate a 2D/3D switchable displays including both active- and passive-matrix LED displays having either a top- or bottom-emitter architecture.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention.

PARTS LIST 2 peak eye sensitivity
4 short wavelength
6 long wavelengths
12 Light source
12r Red light source
12g Green light source
12b Blue light source
13 Polarizer
13r Polarizer, red light path
13g Polarizer, green light path
13b Polarizer, blue light path
14 Uniformizing optics
14r1 Uniformizing optics, red light path
14r2 Uniformizing optics, red light path
14g1 Uniformizing optics, green light path
142g Uniformizing optics, green light path
14b1 Uniformizing optics, blue light path
14b2 Uniformizing optics, blue light path
16 Condenser lens
16r1 Condenser lens, red light path
16r2 Condenser lens, red light path
16g1 Condenser lens, green light path
16g2 Condenser lens, green light path
16b1 Condenser lens, blue light path
16b2 Condenser lens, blue light path
18 Polarizing beamsplitter
18r Polarizing beamsplitter, red light path
18g Polarizing beamsplitter, green light path
18b Polarizing beamsplitter, blue light path
19a Bandpass filter
19b Bandpass filter
20 Spatial light modulator
20r1 Spatial light modulator, red light path
20r2 Spatial light modulator, red light path
20g1 Spatial light modulator, green light path
20g2 Spatial light modulator, green light path
20b1 Spatial light modulator, blue light path
20b2 Spatial light modulator, blue light path.
21 Spatial light modulator 22 Analyzer
23 Spatial light modulator
30 Dichroic combiner
31 substrate
32 X-cube
35 light source
35g green light source
35b blue light source
35r red light source
35r1 red light source
35r2 red light source
40 dichroic filter
40r1 dichroic filter
40r2 dichroic filter
70 display system
72 spherical lens
73 color combining element
74 cylindrical lens
75 lens
77 scanning mirror
80 control logic processor
82 turning mirror
85 electromechanical grating light modulator
85r electromechanical grating light modulator, red
85g electromechanical grating light modulator, green
85b electromechanical grating light modulator, blue
90 display surface
100 Visible gamut
102 Rec 709 gamut
104 NTSC TV gamut
106 gamut for the first set of emitters
107 gamut for the second set of emitters
108 intersect gamut
109 union gamut
110 projection lens
111 control logic processor
112 cross-order filter
118r Red sensitivity curve
118g Green sensitivity curve
118b Blue sensitivity curve
140 Display surface
170 portion of a full-color display
176 R1, red light-emitting elements of first set of emitters
180 G1, green light-emitting elements of first set of emitters
186 B1, blue light-emitting elements of first set of emitters
184 R2, red light-emitting elements of second set of emitters
172 G2, green light-emitting elements of second set of emitters
178 B2, blue light-emitting elements of second set of emitters
188, 190 power lines
192, 194 select lines
196, 198, 200, 202 drive lines
212 LED array
213 LED array
214 LED array
212r1 LED array, red light path
212r2 LED array, red light path
212g1 LED array, green light path
212g2 LED array, green light path
212b1 LED array, blue light path
212b2 LED array, blue light path
204 select TFTs
206 capacitor
208 power TFT
220 model emitter spectrum
222 full-width-half-maximum
224 peak value
226 dominant wavelength
230 spectrum locus
232 u'v' locus, FWHM=30 nm
234 u'v' locus, FWHM=50 nm
236 u'v' locus, FWHM=80 nm
240 luminous efficacy vs. dominant wavelength, FWHM=1 nm
242 luminous efficacy vs. dominant wavelength, FWHM=10 nm
244 luminous efficacy vs. dominant wavelength, FWHM=30 nm
246 luminous efficacy vs. dominant wavelength, FWHM=50 nm
248 luminous efficacy vs. dominant wavelength, FWHM=80 nm
250 selector
252 2D data path
254 3D data path
255 display system
262 display controller
264 row driver
266 column driver
268 row signal
270 column signal
272 incoming image information
274 synchronization signal
276 color signal
280 first processor
282 second processor
290 2D image processing path
292 3D image processing path
300 2D/3D switchable display system
305 flat panel 2D/3D switchable display system
310 3D image-viewing glasses
312 electrode
314 EL unit(s)
316 electrode
331 semiconductor matrix
333 light emitting layer
335,337 charge transport layers
339 quantum dot
340 LED
360 transmission response curve
362 transmission response curve
400 first set of emitters
405 second set of emitters
500 display
505 flat panel display
510 projection display system
515 first image
520 second image

The invention claimed is:

1. A 2D/3D switchable flat panel display system that produces two dimensional and three dimensional images for display comprising:
(a) a selector for selecting from a two-dimensional (2D) or a three-dimensional (3D) image processing path;
(b) a first processor for processing image data through the two-dimensional image processing path;
(c) a second processor, independent of the first processor, for processing image data through the three dimensional image processing path;
(d) a first set of at least three narrow band emitters comprising a plurality of independently controlled thin film light emitting elements having corresponding first peak emission wavelengths;

(e) a second set of at least three narrow band emitters comprising a plurality of independently controlled thin film light emitting elements having corresponding second peak emission wavelengths which are different than the first peak emission wavelengths; and (f) a controller that during a 2D operation activates both first and second sets of narrow band emitters to present a single image, and while during a 3D operation activates the first set of narrow band emitters to present a first image having one half of stereo image information and activates the second set of narrow band emitters to present a second image having a second half of stereo image information.

2. The 2D/3D switchable flat panel display of claim 1, wherein the first set of narrow band emitters has a corresponding gamut and the second set of narrow band emitters has a different gamut from the first set of narrow band emitters, and during the 3D operation the displayed image is mapped to a gamut within an intersection of the gamuts corresponding to the first and second emitters.

3. The 2D/3D switchable flat panel display of claim 2 wherein during the 3D operation the displayed image is mapped to the entire gamut defined by the intersection of the gamuts corresponding to the first and second narrow band emitters.

4. The 2D/3D switchable display of flat panel claim 1, wherein the first set of narrow band emitters has a corresponding gamut and the second set of narrow band emitters has a different gamut from the first set of narrow band emitters, and during the 2D operation the displayed image is mapped to the gamut defined by union of the corresponding gamuts for the first and second set of narrow band emitters.

5. The 2D/3D switchable flat panel display of claim 1 wherein during the 2D operation the gamut of the displayed image has an intersection area with the NTSC triangle of equal to or greater than 95% and wherein the gamut of the displayed image has an intersection area with the Rec. 709 triangle of equal to or greater than 95%.

6. The 2D/3D switchable flat panel display of claim 1 wherein during the 3D operation the gamut of the displayed image has an intersection area with the Rec. 709 triangle of equal to or greater than 95%.

7. The 2D/3D switchable flat panel display of claim 1 wherein the first set of at least three narrow band emitters and the second set of at least three narrow band emitters have stereo channel cross-talk less than 5%.

8. The 2D/3D switchable flat panel display of claim 1 wherein the 2D power as defined by the radiance in $W/(sr \cdot m^2)$ needed to produce a white of 100 cd/m² using any three of the narrow band emitters is less than 210 $W/(sr \cdot m^2)$.

9. The 2D/3D switchable flat panel display of claim 1 wherein the 3D power as defined by the sum of the radiances in $W/(sr \cdot m^2)$ needed to produce a white of 100 Cd/m² using the first set of at least three narrow band emitters and the optical power in $W/(sr \cdot m^2)$ needed to produce the same white of 100 Cd/m² using the second set of at least three narrow band emitters is less than 600 $W/(sr \cdot m^2)$.

10. The 2D/3D switchable display system of claim 1, wherein at least one thin film light emitting element comprises a light emitting diode.

11. The 2D/3D switchable display system of claim 10, wherein the light emitting diode comprises inorganic core/shell quantum dots.

12. The 2D/3D switchable display system of claim 1, wherein at least one the thin film light emitting element comprises: a first patterned electrode; a second electrode opposed to the first electrode; and a polycrystalline inorganic light emitting layer comprising core/shell quantum dots within a semiconductor matrix formed between the electrodes.

13. The 2D/3D switchable flat panel display of claim 1 wherein the first set of at least three narrow band emitters and the second set of at least three narrow band emitters each have a FWHM of no more than 30 nm.

14. The 2D/3D switchable flat panel display of claim 1 wherein the first set of at least three narrow band emitters and the second set of at least three narrow band emitters each have a FWHM of no more than 15 nm.

15. The 2D/3D switchable flat panel display of claim 1 further comprising active matrix circuitry.

16. The 2D/3D switchable flat panel display of claim 1 wherein the thin film light emitting elements have a top- or bottom-emitter architecture.

* * * * *